US008687815B2

(12) United States Patent
Ong

(10) Patent No.: US 8,687,815 B2
(45) Date of Patent: Apr. 1, 2014

(54) METHOD AND AUDIO SYSTEM FOR PROCESSING MULTI-CHANNEL AUDIO SIGNALS FOR SURROUND SOUND PRODUCTION

(75) Inventor: Kok Huan Ong, Singapore (SG)

(73) Assignee: Creative Technology Ltd, Singapore (SG)

( * ) Notice: Subject to any disclaimer, the term of this patent is extended or adjusted under 35 U.S.C. 154(b) by 1150 days.

(21) Appl. No.: 12/614,375

(22) Filed: Nov. 6, 2009

(65) Prior Publication Data

US 2011/0112664 A1 May 12, 2011

(51) Int. Cl.
*G06F 17/00* (2006.01)
*H04R 5/00* (2006.01)

(52) U.S. Cl.
USPC .......... 381/17; 700/94

(58) Field of Classification Search
USPC .......... 381/17–19; 700/94
See application file for complete search history.

(56) References Cited

U.S. PATENT DOCUMENTS

| | | | | |
|---|---|---|---|---|
| 4,696,036 A * | 9/1987 | Julstrom | ... | 381/22 |
| 5,610,986 A * | 3/1997 | Miles | ... | 381/27 |
| 5,757,927 A * | 5/1998 | Gerzon et al. | ... | 381/20 |
| 5,796,844 A * | 8/1998 | Griesinger | ... | 381/18 |
| 5,870,480 A * | 2/1999 | Griesinger | ... | 381/18 |
| 6,081,602 A * | 6/2000 | Meyer et al. | ... | 381/99 |
| 6,507,659 B1 * | 1/2003 | Iredale et al. | ... | 381/26 |
| 6,697,491 B1 * | 2/2004 | Griesinger | ... | 381/20 |
| 6,853,732 B2 * | 2/2005 | Scofield | ... | 381/27 |
| 7,177,432 B2 * | 2/2007 | Eid et al. | ... | 381/22 |
| 7,254,239 B2 * | 8/2007 | Fincham | ... | 381/17 |
| 7,261,180 B1 * | 8/2007 | Faranda et al. | ... | 181/199 |
| 7,688,989 B2 * | 3/2010 | Willems | ... | 381/310 |
| 8,335,331 B2 * | 12/2012 | Johnston et al. | ... | 381/307 |
| 2002/0006206 A1 * | 1/2002 | Scofield | ... | 381/27 |
| 2003/0039365 A1 * | 2/2003 | Eid et al. | ... | 381/27 |
| 2006/0291669 A1 * | 12/2006 | Aylward et al. | ... | 381/98 |
| 2007/0183608 A1 * | 8/2007 | Willems | ... | 381/307 |
| 2009/0185693 A1 * | 7/2009 | Johnston et al. | ... | 381/17 |
| 2011/0081024 A1 * | 4/2011 | Soulodre | ... | 381/17 |

* cited by examiner

*Primary Examiner* — Vivian Chin
*Assistant Examiner* — Leonard M Giannone
(74) *Attorney, Agent, or Firm* — Creative Technology Ltd

(57) ABSTRACT

A method and audio system for processing multi-channel audio signals for surround sound production on a plurality of loudspeakers to a listening area. The plurality of loudspeakers is front located with respect to the listening area. The plurality of loudspeakers comprises an outer left loudspeaker, an inner left loudspeaker, an inner right loudspeaker and an outer right loudspeaker. The multi-channel audio signals comprise one or more low frequency effects audio signals and one or more audio signals categorized as front based left inclined, front based right inclined, rear based left inclined, rear based right inclined, and center based. The method comprising filtering and adjusting phase and amplitude of one or more audio signals that are front based left inclined, front based right inclined, rear based left inclined and rear based right inclined in a specific manner, and transmitting the one or more processed audio signals in a specific manner to the outer left loudspeaker, the outer right loudspeaker, the inner left loudspeaker and the inner right loudspeaker.

24 Claims, 9 Drawing Sheets

METHOD AND AUDIO SYSTEM FOR PROCESSING MULTI-CHANNEL AUDIO SIGNALS FOR SURROUND SOUND PRODUCTION

FIELD OF INVENTION

The present invention relates to a method and audio system for processing multi-channel audio signals for surround sound production on a plurality of loudspeakers to a listening area, where the plurality of loudspeakers are generally front located when viewed from the listening area.

BACKGROUND

Ideally, a surround sound playback system producing acoustic signals from a multi-channel audio source to a listening area should have loudspeakers positioned at all corners of the listening area to correspond with the designated position of each audio channel with a specific direction output of the multi-channel audio source. For instance, a 5.1 channel audio source has a front left audio channel, front right audio channel, a centre audio channel, a rear left audio channel, a rear right audio channel and a low frequency effects audio channel, the listening area should have 6 loudspeakers including a subwoofer located at the designated front left, front right, centre, rear left and rear right audio channel locations. The position of the subwoofer is preferably at the front of the listening area, centrally located and placed close to a wall.

In reality, it is inconvenient and difficult to position loudspeakers according to the designated position of the audio channels of a multi-channel audio source. Usually the mains powering the loudspeakers are located at the front of the listening area and wiring to connect up the rear loudspeakers is a problem. A solution to this problem is to use only front located speakers. However, this introduces another problem, which is the lack of surround sound effects, in particular, the lack of acoustic signals from the rear.

Audio systems attempting to provide surround sound effects using front located loudspeakers do exist. They typically make use of Digital Signal Processors to execute complicated algorithms to produce virtualised rear surround sound effects, which can be costly. Without using Digital Signal Processors, such audio systems are generally complex and difficult to implement. Furthermore, using Digital Signal Processors or not, such conventional audio systems generally produce sharp and narrow sound images, as illustrated in FIG. 1A, which undesirably restrict the area in which surround sound effects produced could be experienced.

A need therefore exists to provide a method and audio system for processing multi-channel audio signals for surround sound production on a plurality of loudspeakers to a listening area that addresses at least the above-mentioned problems.

SUMMARY

In accordance with an aspect of the present invention, there is provided a method for processing multi-channel audio signals for surround sound production on a plurality of loudspeakers to a listening area, the plurality of loudspeakers being front located with respect to the listening area, the plurality of loudspeakers comprising an outer left loudspeaker, an inner left loudspeaker, an inner right loudspeaker and an outer right loudspeaker, the multi-channel audio signals comprising one or more low frequency effects audio signals and one or more audio signals that are front based left inclined, front based right inclined, rear based left inclined, rear based right inclined, and centre based, the method comprising: (a) adjusting phase and amplitude of the one or more audio signals that are rear based left inclined to produce one or more time delayed and amplitude adjusted rear left signals; (b) adjusting phase and amplitude of the one or more audio signals that are rear based right inclined to produce one or more time delayed and amplitude adjusted rear right signals; (c) adjusting amplitude of the one or more audio signals that are rear based left inclined to produce one or more amplitude adjusted rear left signals; (d) adjusting amplitude of the one or more audio signals that are rear based right inclined to produce one or more amplitude adjusted rear right signals; (e) filtering the one or more time delayed and amplitude adjusted rear right signals, the one or more amplitude adjusted rear left signals and the one or more audio signals that are front based left inclined, the filtering of step (e) comprising dampening of high frequency components of the signals being filtered; (f) filtering the one or more time delayed and amplitude adjusted rear left signals, the one or more amplitude adjusted rear right signals and the one or more audio signals that are front based right inclined, the filtering of step (f) comprising dampening of high frequency components of the signals being filtered; (g) adjusting the phase of the one or more time delayed and amplitude adjusted rear right signals, the one or more amplitude adjusted rear left signals and the one or more audio signals that are front based left inclined to introduce a time delay to each of them; (h) adjusting the phase of the one or more time delayed and amplitude adjusted rear left signals, the one or more amplitude adjusted rear right signals and the one or more audio signals that are front based right inclined to introduce a time delay to each of them; (i) transmitting the one or more audio signals that are front based left inclined, the one or more audio signals that are rear based left inclined and all the adjusted signals at step (g) to the outer left loudspeaker; (j) transmitting the one or more audio signals that are front based right inclined, the one or more audio signals that are rear based right inclined and all the adjusted signals at step (h) to the outer right loudspeaker; (k) transmitting the one or more audio signals that are centre based and all the filtered signals at step (e) to the inner left loudspeaker; and (l) transmitting the one or more audio signals that are centre based and all the filtered signals at step (f) to the inner right loudspeaker.

The method may further comprise transmitting the one or more low frequency effects audio signals to a subwoofer of the plurality of loudspeakers for audio bass production.

The method may further comprise low pass filtering each of the multi-channel audio signals, high pass filtering each of the multi-channel audio signals except the one or more low frequency effects audio signals before commencement of steps (i), (j), (k) and (l), and, transmitting each of the low pass filtered multi-channel audio signals to a subwoofer of the plurality of loudspeakers for audio bass production, wherein the filtering of steps (e) and (f) comprising high pass filtering the signals being filtered at steps (e) and (f).

The method may further comprise adjusting amplitude at steps (a) and (b) may adjust said signals by a first scaling factor in the range of 0.35 to 0.75.

The method may further comprise adjusting amplitude at steps (c) and (d) may adjust said signals by a second scaling factor in the range of 0.7 to 1.5.

The method may further comprise adjusting amplitude of the one or more audio signals that are front based left inclined and front based right inclined by a third scaling factor in the range of 0.5 to 1.

The method may further comprise adjusting amplitude of the one or more audio signals that are centre based by negative 3 decibels.

The method may further comprise steps for converting stereo channel audio signals into audio input signals for surround sound production on the plurality of loudspeakers, the steps comprising: providing the left channel audio signal of the stereo channel audio signals as a front based left inclined audio signal of the multi-channel audio signals; providing the right channel audio signal of the stereo channel audio signals as a front based right inclined audio signal of the multi-channel audio signals; and providing zero signal as each of the one or more low frequency effects audio signal and each of the one or more audio signals that are centre based, rear based left inclined, and rear based right inclined.

In accordance with another aspect of the present invention, there is provided an audio system for processing multi-channel audio signals for surround sound production on a plurality of loudspeakers to a listening area, the plurality of loudspeakers being front located with respect to the listening area, the plurality of loudspeakers comprising an outer left loudspeaker, an inner left loudspeaker, an inner right loudspeaker and an outer right loudspeaker, the multi-channel audio signals comprising one or more low frequency effects audio signals and one or more audio signals that are front based left inclined, front based right inclined, rear based left inclined, rear based right inclined, and centre based, the audio system comprising: first adjusting means for adjusting phase and amplitude of the one or more audio signals that are rear based left inclined to produce one or more time delayed and amplitude adjusted rear left signals; second adjusting means for adjusting phase and amplitude of the one or more audio signals that are rear based right inclined to produce one or more time delayed and amplitude adjusted rear right signals; first scaling means for adjusting amplitude of the one or more audio signals that are rear based left inclined to produce one or more amplitude adjusted rear left signals; second scaling means for adjusting amplitude of the one or more audio signals that are rear based right inclined to produce one or more amplitude adjusted rear right signals; first filtering means for filtering the one or more time delayed and amplitude adjusted rear right signal, the one or more amplitude adjusted rear left signal and the one or more audio signals that are front based left inclined, the high frequency components of the signals being dampened by the first filtering means; second filtering means for filtering the one or more time delayed and amplitude adjusted rear left signal, the one or more amplitude adjusted rear right signal and the one or more audio signals that are front based right inclined, the high frequency components of the signals being dampened by the second filtering means; first phase adjusting means for adjusting the phase of the one or more time delayed and amplitude adjusted rear right signal, the one or more amplitude adjusted rear left signal and the one or more audio signals that are front based left inclined to introduce a time delay in each of them; and second phase adjusting means for adjusting the phase of the one or more time delayed and amplitude adjusted rear left signal, the one or more amplitude adjusted rear right signal and the one or more audio signals that are front based right inclined to introduce a time delay in each of them, the outer left loudspeaker receiving the one or more audio signals that are front based left inclined, the one or more signals that are rear based left inclined and all the signals adjusted by the first phase adjusting means, the outer right loudspeaker receiving the one or more audio signals that are front based right inclined, the one or more signals that are rear based right inclined and all the signals adjusted by the second phase adjusting means, the inner left loudspeaker receiving the one or more audio signals that are centre based and all the signals adjusted by the first filtering means, and the inner right loudspeaker receiving the one or more audio signals that are centre based and all the signals adjusted by the second filtering means.

The audio system may further comprise a subwoofer receiving the one or more low frequency effects audio signals for audio bass production.

The audio system may further comprise low pass filtering means for filtering each of the multi-channel audio signals; high pass filtering means for filtering each of the multi-channel audio signals except the one or more low frequency effects audio signals before the outer left loudspeaker, the outer right loudspeaker, the inner left loudspeaker and the inner right loudspeaker receive any audio signals; and a subwoofer receiving each of the low pass filtered multi-channel audio signals for audio bass production, wherein the filtering carried out by the first filtering means and the second filtering means being high pass filtering.

The first adjusting means and the second adjusting means may adjust the amplitude of the respective signals by a first scaling factor in the range of 0.35 to 0.75.

The first scaling means and the second scaling means may adjust the amplitude of the respective signals by a second scaling factor in the range of 0.7 to 1.5.

The audio system may further comprise third scaling means for adjusting the amplitude of the one or more audio signals that are front based left inclined and front based right inclined by a third scaling factor in the range of 0.5 to 1.

The amplitude of the one or more audio signals that are centre based may be scaled by negative 3 decibels.

In the conversion of stereo channel audio signals into audio input signals for surround sound production on the plurality of loudspeakers, the left channel audio signal of the stereo channel audio signals may be provided as a front based left inclined audio signal of the multi-channel audio signals, the right channel audio signal of the stereo channel audio signals may be provided as a front based right inclined audio signal of the multi-channel audio signals, and zero signal may be provided as each of the one or more low frequency effects audio signal and each of the one or more audio signals that are centre based, rear based left inclined, and rear based right inclined.

The outer left loudspeaker, the inner left loudspeaker, the outer right loudspeaker and the inner right loudspeaker may be facing the listening area and may be spaced along a speaker axis defined as a line passing through the outer left, the inner left, the inner right and the outer right locations of said loudspeakers.

The subwoofer may be located between the inner left loudspeaker and the inner right loudspeaker.

The subwoofer may be located between the inner left loudspeaker and the inner right loudspeaker.

A first plane on which the outer left loudspeaker is mounted on may be arranged at a first angle relative to a second plane on which the inner left loudspeaker is mounted on; and a third plane on which the outer right loudspeaker is mounted on may be arranged at a second angle relative to a fourth plane on which the inner right loudspeaker is mounted on.

The outer left loudspeaker or the outer right loudspeaker may be stacked on top or below the inner left loudspeaker or the inner right loudspeaker respectively.

Each of the first angle and the second angle may be in the range of 90 to 180 degrees.

The value of each of the first angle or the second angle may vary.

The plurality of loudspeakers may be contained within a single enclosure.

In accordance with yet another aspect of the present invention, there is provided a Digital Signal Processor for carrying out the method for processing multi-channel audio signals for surround sound production on a plurality of loudspeakers to a listening area, the plurality of loudspeakers being front located with respect to the listening area, the plurality of loudspeakers comprising an outer left loudspeaker, an inner left loudspeaker, an inner right loudspeaker and an outer right loudspeaker, the multi-channel audio signals comprising one or more low frequency effects audio signals and one or more audio signals that are front based left inclined, front based right inclined, rear based left inclined, rear based right inclined, and centre based, the method comprising: (a) adjusting phase and amplitude of the one or more audio signals that are rear based left inclined to produce one or more time delayed and amplitude adjusted rear left signals; (b) adjusting phase and amplitude of the one or more audio signals that are rear based right inclined to produce one or more time delayed and amplitude adjusted rear right signals; (c) adjusting amplitude of the one or more audio signals that are rear based left inclined to produce one or more amplitude adjusted rear left signals; (d) adjusting amplitude of the one or more audio signals that are rear based right inclined to produce one or more amplitude adjusted rear right signals; (e) filtering the one or more time delayed and amplitude adjusted rear right signals, the one or more amplitude adjusted rear left signals and the one or more audio signals that are front based left inclined, the filtering of step (e) comprising dampening of high frequency components of the signals being filtered; (f) filtering the one or more time delayed and amplitude adjusted rear left signals, the one or more amplitude adjusted rear right signals and the one or more audio signals that are front based right inclined, the filtering of step (f) comprising dampening of high frequency components of the signals being filtered; (g) adjusting the phase of the one or more time delayed and amplitude adjusted rear right signals, the one or more amplitude adjusted rear left signals and the one or more audio signals that are front based left inclined to introduce a time delay to each of them; (h) adjusting the phase of the one or more time delayed and amplitude adjusted rear left signals, the one or more amplitude adjusted rear right signals and the one or more audio signals that are front based right inclined to introduce a time delay to each of them; (i) transmitting the one or more audio signals that are front based left inclined, the one or more audio signals that are rear based left inclined and all the adjusted signals at step (g) to the outer left loudspeaker; (j) transmitting the one or more audio signals that are front based right inclined, the one or more audio signals that are rear based right inclined and all the adjusted signals at step (h) to the outer right loudspeaker; (k) transmitting the one or more audio signals that are centre based and all the filtered signals at step (e) to the inner left loudspeaker; and (l) transmitting the one or more audio signals that are centre based and all the filtered signals at step (f) to the inner right loudspeaker.

BRIEF DESCRIPTION OF THE DRAWINGS

Embodiments of the invention will be better understood and readily apparent to one of ordinary skill in the art from the following written description, by way of example only and in conjunction with the drawings, in which.

DETAILED DESCRIPTION

Figure 1A:
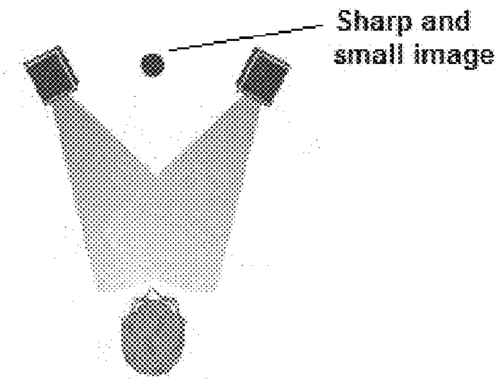
Figure 1A (Prior Art)
FIG. 1A shows the top view of a conventional audio system with two loudspeakers producing sharp and narrow sound images.
Figure 1B:
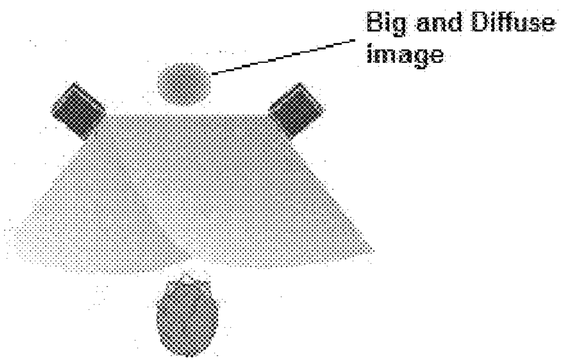
Figure 1B (Prior Art)
FIG. 1B shows the top view of a conventional audio system with two loudspeakers producing wide and diffused sound images.
Figure 1:
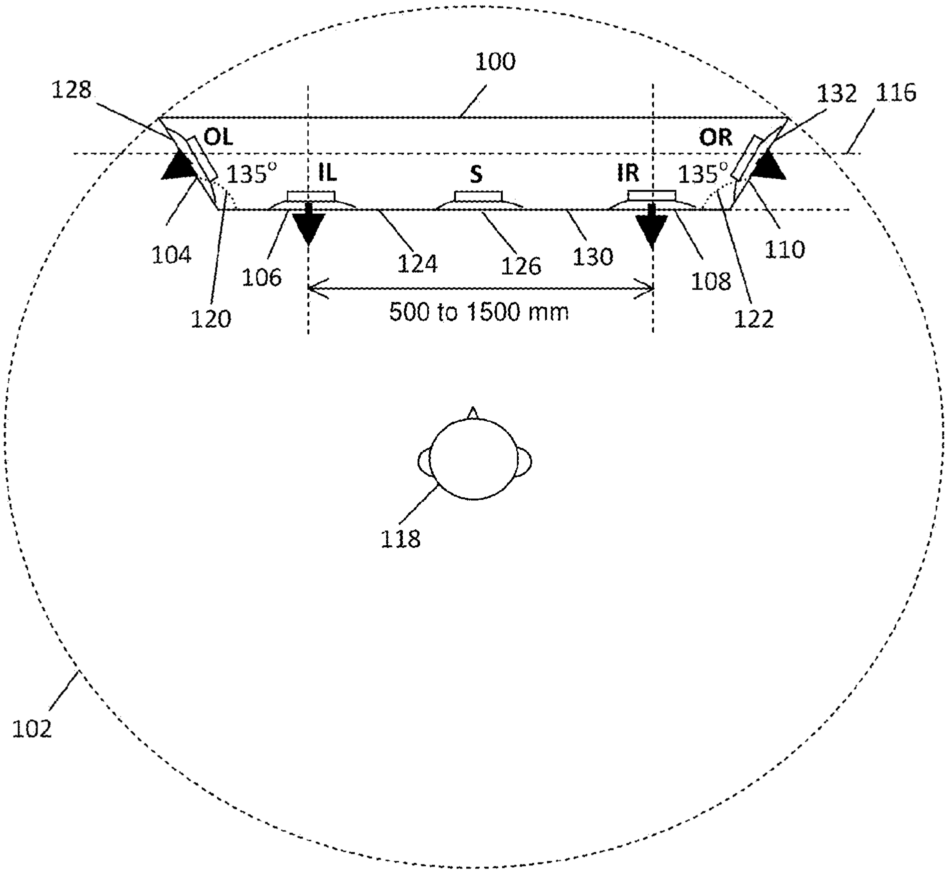
FIG. 1 shows the top view of an audio system of an example embodiment of the present invention in use.

FIG. 1 illustrates a top view of an audio system 100 of an example embodiment of the present invention. The audio system 100 processes multi-channel audio signals for surround sound production on four loudspeakers 104, 106, 108 and 110, and a subwoofer 126, to a listening area 102. Generally, example embodiments of the present invention process the multi-channel audio signals in a manner, which can advantageously be implemented using simple circuitry and still provide good surround sound quality characterized by the production of wide and diffused sound images at the four loudspeakers 102, 104, 106 and 108, as opposed to sharper and narrower sound images produced by some conventional audio systems. FIG. 1B illustrates how wide and diffuse sound images can be produced by two loudspeakers.

It is appreciated that although the audio system 100 shows four loudspeakers 104, 106, 108 and 110, and a subwoofer 126, the number of loudspeakers could be four or more in other example embodiments of the present invention. There could also be one or more subwoofers. A listener 118 residing at the centre of the listening area 102 is included in FIG. 1 for illustration purposes.

In the example embodiment, the four loudspeakers 104, 106, 108 and 110, and the subwoofer 126, are contained within a single enclosure, which is, in this case, an elongated rectangular body 124. The four loudspeakers 104, 106, 108 and 110, and the subwoofer 126, are facing the listening area 102 and spaced along a speaker axis 116 defined as a line passing through the outer left, the inner left, the inner right and the outer right locations of the four loudspeakers. The four loudspeakers 104, 106, 108 and 110 consists of two pairs of loudspeakers (loudspeakers 104 and 106 being a pair, and loudspeakers 108 and 110 being another pair), each pair being symmetrically disposed on the left and right sides respectively of the elongated rectangular body 124. The four loudspeakers are namely an outer left loudspeaker 104, an inner left loudspeaker 106, an inner right loudspeaker 108 and an outer right loudspeaker 110. The subwoofer 126 is positioned between the inner left loudspeaker 106 and the inner right loudspeaker 108.

It is appreciated that all the four loudspeakers 104, 106, 108 and 110, including the subwoofer 126, in FIG. 1 are made visible for illustration purposes. They are not visible in the top views of actual implementations, as they would be covered by the chassis of the elongated rectangular body 124. Each loudspeaker 104, 106, 108, 110 or 126 has one or more electro-mechanical devices, such as, an acoustic transducer that is suitable for converting electrical analogue sound signals into sound. The sound produced by these loudspeakers 104, 106, 108, 110 and 126 may cover the full audible frequency range or at least a major portion of the audio frequency range.

In the example embodiment, a first plane 128 on which the outer left loudspeaker 104 is mounted on the elongated rectangular body 124 is at an angle 120 of about 135 degrees relative to a second plane 130 on which the inner left loudspeaker 106 is mounted on the elongated rectangular body 124. Similarly, a third plane 132 on which the outer right loudspeaker 110 is mounted on the elongated rectangular body 124 is at an angle 122 of about 135 degrees relative to the second plane 130 on which the inner right loudspeaker 108 is mounted on at the elongated rectangular body 124. The arrows in FIG. 1 illustrate the directions of sound output. The angles 120 and 122 are dependent on the directivity of the outer left loudspeaker 104 and the outer right loudspeaker 110 respectively. The suitable range of values for angles 120 and 122 is about 90 degrees to about 180 degrees. Directivity of a loudspeaker refers to the size of the area covered by the sound image produced by the respective loudspeaker in a particular direction in the listening area 102. If directivity is good i.e. sound dispersion of the loudspeakers covers a wide area, the angle 122 can have a value lesser than 135 degrees. If directivity is poor, i.e. sound dispersion of the loudspeakers covers a narrower area, the angle 122 should have a value more than 135 degrees.

The distance between the pairs of loudspeakers, which in this embodiment refers to the distance between the inner left loudspeaker 106 and the inner right loudspeaker 108, determines the wideness of the surround sound effects. The distance between the inner left loudspeaker 106 and the inner right loudspeaker 108 is adjusted to suit different sizes of the listening area 102. For the embodiments described herein with reference to the figures, the preferred value for this distance ranges from about 500 mm to about 1500 mm.

It is appreciated that in other example embodiments, the angle 120 of the first plane 128 relative to the second plane 130 and the angle 122 of the third plane 132 relative to the second plane 130 could both vary from the range of 90 to 180 degrees.

The multi-channel audio signals processed by the audio system 100 in FIG. 1 for surround sound production on the four loudspeakers 104, 106, 108 and 110, and the subwoofer 126, may include one or more low frequency effects audio signals and one or more audio signals that are front based left inclined, front based right inclined, rear based left inclined, rear based right inclined and centre based.

For illustration in the example embodiment, the multi-channel audio signals processed by the audio system 100 in FIG. 1 are specifically 5.1 audio channel inputs, which consist of a discrete front left audio signal (FL), a discrete front right audio signal (FR), a discrete centre audio signal (C), a discrete rear left audio signal (RL), a discrete rear right audio signal (RR) and a discrete low frequency effects signal (LFE). Each of these discrete signals corresponds with an audio channel.

FIGS. 2, 6, 8, 11 in combination illustrate an example of a circuit block diagram 200 of the audio system 100 in FIG. 1 in the case where a Digital Signal Processor is not used. The circuitry of the audio system 100 is split into four separate figures to make illustration clearer. In the actual implementation, the circuit block diagram 200 of the audio system 100 would include all the circuit components found in FIGS. 2, 6, 8 and 11.

As mentioned earlier, the audio system 100 processes multi-channel audio signals, in particular, 5.1 audio channel input signals, for surround sound production on the four loudspeakers 104, 106, 108 and 110, and the subwoofer 126, to the listening area (102 in FIG. 1). In the example embodiment, the subwoofer 126 is used for producing low frequency components of acoustic signals. The four loudspeakers 104, 106, 108 and 110 are used for producing high frequency components of acoustic signals. It is appreciated that in example embodiments of the present invention having only the four loudspeakers 104, 106, 108 and 110 without the subwoofer 126, the four loudspeakers 104, 106, 108 and 110 would be used for producing both low and high frequency components of acoustic signals. In some example embodiments, the subwoofer 126 may solely produce acoustic signals of the discrete low frequency effects signal (LFE) of the 5.1 channel audio signals.

Figure 2:
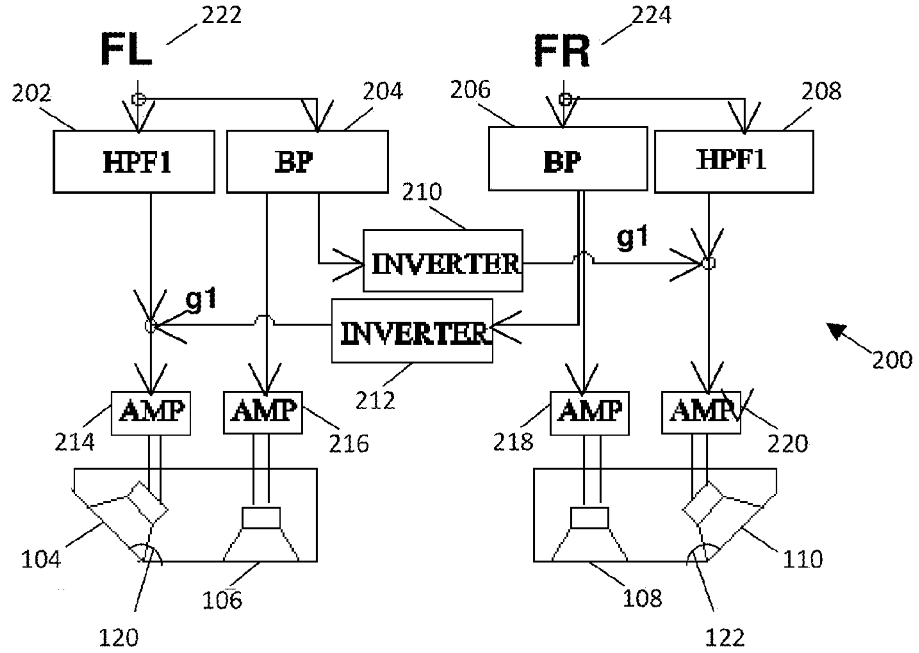
FIG. 2 shows a block diagram of the components of an audio system of an example embodiment of the present invention.

FIG. 2 shows the electronic components of the audio system 100 for processing the discrete front left audio signal (FL) 222 and the discrete front right audio signal (FR) 224 of the 5.1 channel audio signals respectively. The arrows in FIG. 2 indicate the direction of signal flow.

The discrete front left audio signal (FL) 222 is sent to a first High Pass Filter 202 to filter out the low frequency components of the discrete front left audio signal (FL) 222. It is appreciated that filtering the discrete front left audio signal (FL) 222 using the first High Pass Filter 202 is not required in example embodiments without the subwoofer 126 because in the absence of the subwoofer 126, the outer left loudspeaker 104, inner left loudspeaker 106, inner right loudspeaker 108 and the outer right loudspeaker 110 will produce both high and low frequency components of acoustic signals.

Figure 7:
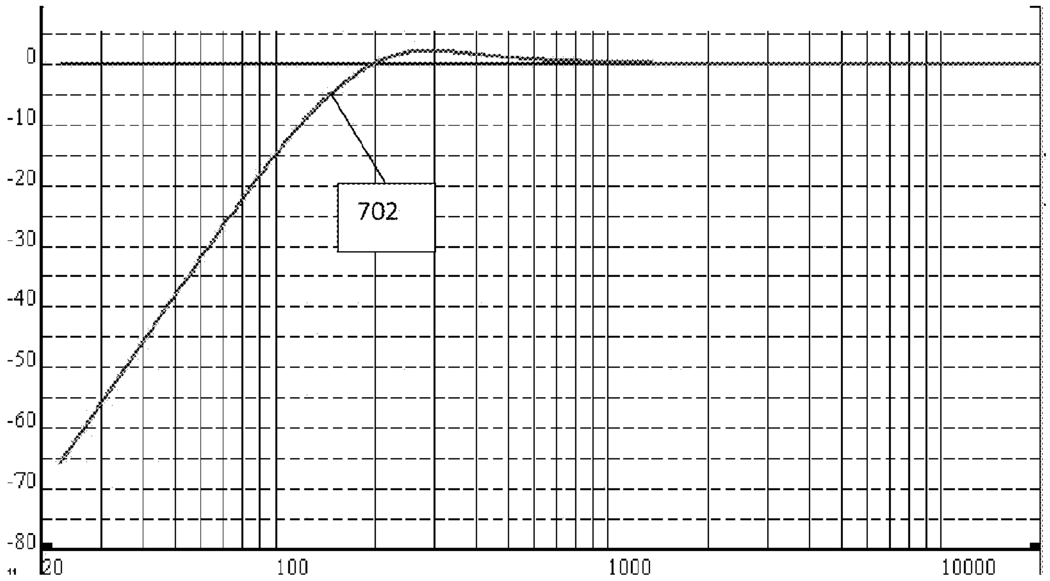
FIG. 7 shows a frequency response graph related to an audio system of an example embodiment of the present invention.

In a separate signal path, the discrete front left audio signal (FL) 222 is sent to a first Band Pass Filter 204, followed by a first inverter 210. The first Band Pass Filter 204 adjusts the discrete front left audio signal (FL) 222 for the virtualization of the sound location of the outer left loudspeaker 104 and the inner left loudspeaker 106 to a location (302 in FIG. 3) located at a distance further left of the outer left loudspeaker 104 by dampening high frequency components of the discrete front left audio signal (FL) 222 in the range of approximately 0.5 KHz to 20 KHz. This dampening is illustrated in FIG. 7. The first Band Pass Filter 204 also filters out low frequency components of the discrete front left audio signal (FL) 222 so that only the subwoofer 126 would be producing acoustic signals having low frequency components. The inverter 210 introduces a time delay (i.e. phase shifting) to the dampened discrete front left audio signal (FL) 222. The time delay is introduced to delay interaural crosstalk so as to widen the sound image perceived by the listener (118 in FIG. 1) in the listening area (102 in FIG. 1).

The reason for creating the virtualized sound locations (302 and 318 in FIG. 3) is to produce a wide stereo sound image effect, which can be heard by the listener (118 in FIG. 1) in the listening area (102 in FIG. 1).

After the discrete front left audio signal (FL) 222 has been processed by the first Band Pass Filter 204 followed by the first inverter 210, the output signal from the first inverter 210 is scaled by a factor of g1, which is in the range of 0.5 to 1. In the example embodiment, the g1 value at this juncture is a gain factor contributed by a first amplifier (not shown in the figure) located downstream (i.e. after signal exits from the first inverter 210) of the first inverter 210. It is appreciated that in other example embodiments, this first amplifier may be incorporated in the circuitry of the first inverter 210. This first amplifier may also be in the form of an operational amplifier, in the form of a voltage divider or the like.

The filtered output signal from the first High Pass Filter 202, together with the band pass filtered and phase shifted output signal from the first inverter 210 that is scaled by g1, are subsequently sent to a second amplifier 214 for signal amplification before being transmitted to the outer left loudspeaker 104 for sound production.

Furthermore, there is present another signal path where the band pass filtered output discrete front left audio signal (FL) 222 is sent directly from the first Band Pass Filter 204 to a third amplifier 216 for signal amplification before being transmitted to the inner left loudspeaker 106 for sound production.

Mirroring the processing of the discrete front left audio signal (FL) 222, the discrete front right audio signal (FR) 224 is sent to a second High Pass Filter 208 having the same design as the first High Pass Filter 202 to filter out the low frequency components of the discrete front right audio signal (FR) 224. Similarly, it is appreciated that filtering the discrete front left audio signal (FR) 224 using the second High Pass Filter 208 is not required in example embodiments without the subwoofer 126 because in the absence of the subwoofer 126, the outer left loudspeaker 104, the inner left loudspeaker 106, the inner right loudspeaker 108 and the outer right loudspeaker 110 will produce both high and low frequency components of acoustic signals.

In a separate signal path, the discrete front right audio signal (FR) 224 is sent to a second Band Pass Filter 206, followed by a second inverter 212. The second Band Pass Filter 206 adjusts the discrete front right audio signal (FR) 224 for the virtualization of the sound location of the outer right loudspeaker 110 and inner right loudspeaker 108 to a location (318 in FIG. 3) located at a distance further left of the outer right loudspeaker 108 by dampening high frequency components of the discrete front right audio signal (FR) 224 in the range of approximately 0.5 KHz to 20 KHz. Similarly, this dampening is illustrated in FIG. 7. The second Band Pass Filter 206 also filters out low frequency components of the discrete front right audio signal (FR) 224 so that only the subwoofer 126 would be producing acoustic signals having low frequency components. The second inverter 212 introduces a time delay (i.e. phase shifting) to the dampened discrete front right audio signal (FR) 224. The time delay is introduced to delay interaural crosstalk so as to widen the sound image perceived by the listener (118 in FIG. 1) in the listening area (102 in FIG. 1).

After the discrete front right audio signal (FR) 224 has been processed by the second Band Pass Filter 206 followed by the second inverter 212, the output signal from the second inverter 212 is scaled by the factor of g1. In the example embodiment, the g1 value at this juncture is a gain factor contributed by a fourth amplifier (not shown in the figure) located downstream (i.e. after signal exits from the second inverter 212) of the second inverter 212. It is appreciated that in other example embodiments, the fourth amplifier may be incorporated in the circuitry of the second inverter 212. The fourth amplifier may also be in the form of an operational amplifier, in the form of a voltage divider, or the like.

The filtered output signal from the second High Pass Filter 208, together with the band pass filtered and phase shifted output signal from the second inverter 212 that is scaled by g1, are subsequently sent to a fifth amplifier 220 for signal amplification before being transmitted to the outer right loudspeaker 110 for sound production.

Furthermore, there is present another signal path where the band pass filtered output discrete front right audio signal (FR) 224 from the second Band Pass Filter 206 is sent to a sixth amplifier 218 for signal amplification before being transmitted to the inner left loudspeaker 106 for sound production.

The aforementioned g1 value affects the wideness of the front inclined sound, a lower g1 will cause the sound effects to be perceived as narrower (i.e. sound source appears to the listener 118 as closer to the centre of the listening area 102) and a higher g1 will cause the sound effects to be perceived as wider (i.e. sound source appears to the listener 118 as coming from further left and right of the listening area 102 as opposed to coming from the centre).

The signal amplification carried out by the second amplifier 214, the third amplifier 216, the fifth amplifier 220 and the sixth amplifier 218 are required so that sufficiently loud acoustic signals can be produced by the four loudspeakers 104, 106, 108 and 110. The strength of each respective signal prior to signal amplification is typically at a maximum of 2 Volts (root mean square). If the non-amplified signal is sent directly to, for example, a 4 ohm loudspeaker, only 1 Watt of sound is produced at most, which is considered unacceptable. In order for a typical 15 Watts, 4 ohm loudspeaker to produce acceptable sound output levels, the signal strength should be amplified to about 7.7 Volts (root mean square) or more.

It is appreciated that the high passing filtering components of the first and second Band Pass Filters 204 and 206 respectively can be omitted in example embodiments without the subwoofer 126 because in the absence of the subwoofer 126, the outer left loudspeaker 104, inner left loudspeaker 106, inner right loudspeaker 108 and the outer right loudspeaker 110 will produce both high and low frequency components.

Figure 3:
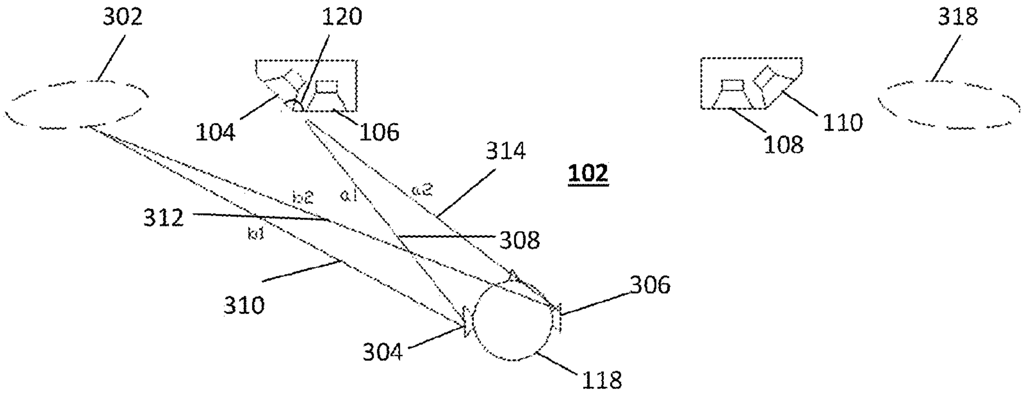
FIG. 3 illustrates virtualized sound production by an audio system of an example embodiment of the present invention.

The virtualized sound output location 302 of the outer left loudspeaker 104 and the inner left loudspeaker 106 is illustrated in FIG. 3. With reference to FIG. 3, sound output a2 314 shows a trajectory of sound travelling to the right ear 306 of the listener 118 located at the centre of the listening area 102 in the case where the sound outputs from the outer left loudspeaker 104 and the inner left loudspeaker 106 are not virtualized. Sound output a2 314 is slightly blocked by the listener's face. Sound output b2 312 shows a trajectory of sound travelling to the right ear 306 of the listener 118 in the case where the sound outputs from the outer left loudspeaker 104 and the inner left loudspeaker 106 are virtualized to the virtualized sound output location 302. The trajectory of the virtualized sound output b2 312 is blocked more by the listener's face compared to the case for sound output a2 314. Thus, there is more time delay for the virtualized sound output b2 312 to reach the listener's right ear 306 and lesser acoustic signal picked up by the listener's right ear 306 compared to the case for non-virtualized sound output a2 314. As such, in order to produce virtualized sound output b2 312, the first Band Pass Filter 204 in FIG. 2 is used to dampen the high frequency components of the discrete front left audio signal (FL) 222 in FIG. 2 in the range of approximately 0.5 KHz to 20 KHz and the first inverter 210 in FIG. 2 is used to introduce time delay to the dampened discrete front left audio signal (FL) 222 in FIG. 2.

Similarly, sound output a1 308 shows a trajectory of sound travelling to the left ear 304 of the listener 118 in case where the sound outputs from the outer left loudspeaker 104 and the inner left loudspeaker 106 are not virtualized. Sound output b1 310 shows a trajectory of sound travelling to the left ear 304 of the listener 118 in the case where the sound outputs from the outer left loudspeaker 104 and the inner left loudspeaker 106 are virtualized to the virtualized sound output location 302. Comparing a1 308 and b1 310, b1 310 is much further to the listener's left ear 304, as such, there is more time delay for the sound to reach the listener's left ear 304 and lesser acoustic signal picked up by the listener's left ear 304 compared to the non-virtualized sound output a1 308. Hence, in order to produce the virtualized b1 310, time delay needs to be introduced, which can be done using the first inverter 210 in FIG. 2, and acoustic signals need to be dampened, which can be done using the first Band Pass Filter 204 in FIG. 2.

It is appreciated that the second inverter 212 and the second Band Pass Filter 206 are used in the same way as the first inverter 210 and the first Band Pass Filter 204 respectively for the production of the virtualized sound output of the outer right loudspeaker 110 and the inner right loudspeaker 108. The aforementioned description written with reference to FIG. 3 could be similarly applied to explain the use of the second inverter 212 and the second Band Pass Filter 206 to enable the outer right loudspeaker 110 and the inner right loudspeaker 108 to create the perceived acoustic signals for the virtualized sound location 318.

Figure 4:
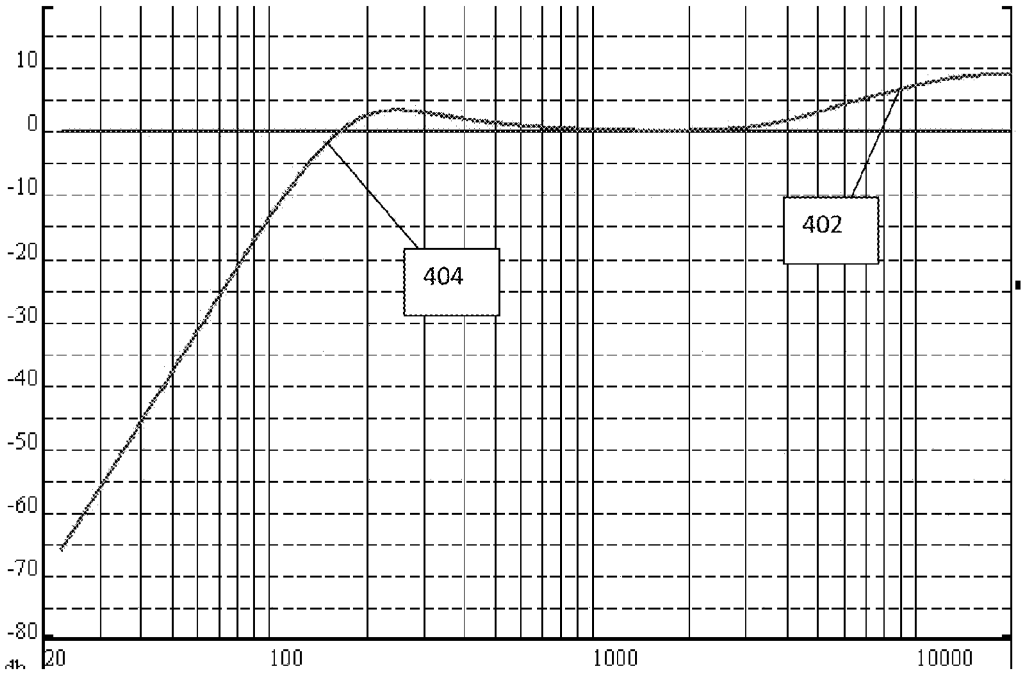
FIG. 4 shows a frequency response graph related to an audio system of an example embodiment of the present invention.

The common frequency response graph of the first and second High Pass Filter 202 and 208 is shown in FIG. 4. With reference to the reference numerals in FIGS. 1 and 2, the signal amplification portion 402 from approximately 2 KHz to 20 KHz is to compensate for the drop in acoustic signal as heard by the listener 118 because the first and third planes 128 and 132 respectively of the elongated rectangular body 124 on which the outer left loudspeaker 104 and the outer right loudspeaker 110 are mounted on are at the angles 120 and 122 respectively, i.e. 135 degrees, relative to the second plane 130 of the elongated rectangular body 124 on which the inner left loudspeaker 106 and the inner right loudspeaker 108 are mounted on. The setting for the signal amplification portion 402 depends on the angles 120 and 122. The high pass filtering portion 404 from approximately 20 Hz to 2 KHz is for extracting the high frequency components of the discrete front left audio signal (FL) 222 and the discrete front right audio signal (FR) 224 so that the subwoofer 126 is used solely for producing low frequency components of all acoustic signals.

Figure 5:
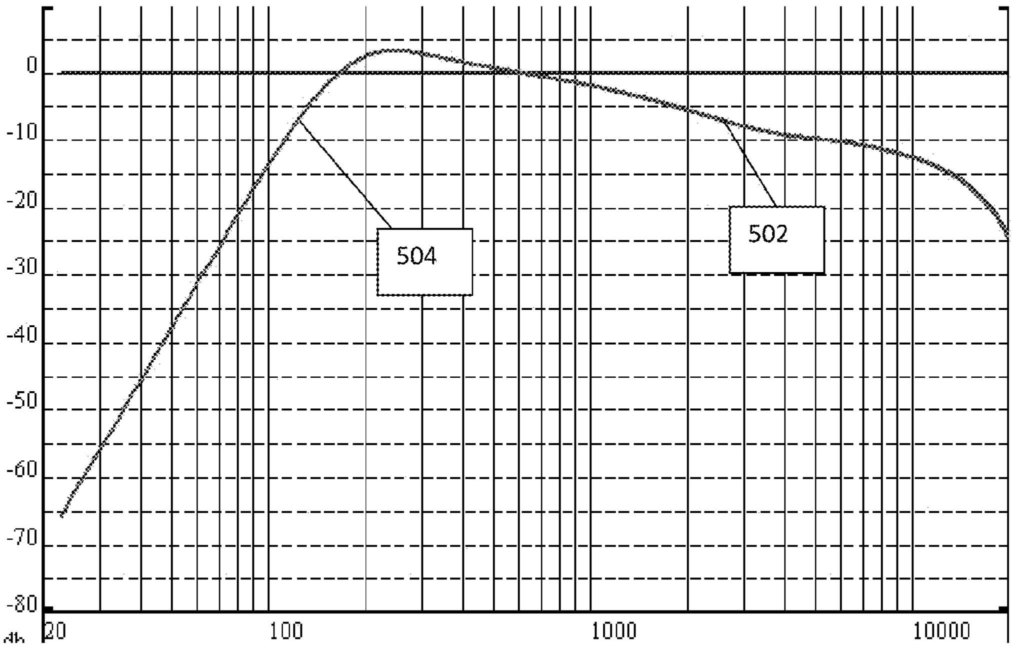
FIG. 5 shows a frequency response graph related to an audio system of an example embodiment of the present invention.

The common frequency response graph of the first and second Band Pass Filters 204 and 206 is shown in FIG. 5. The dampening portion 502 of the signal from approximately 0.5 KHz to 20 KHz illustrates the virtualization of the sound locations 302 and 318 in FIG. 3, which is at a distance further away from the listener's ears compared to the same distance for non-virtualized sound locations. With reference to the reference numerals in FIGS. 1, 2 and 3, further distance means weakened acoustic signals heard by the listener 118, thus, dampening needs to be performed for the virtualization of the sound locations 302 and 318. The high pass filtering portion 504 from approximately 20 Hz to 0.5 KHz is for extracting the high frequency components of the discrete front left audio signal (FL) 222 and the discrete front right audio signal (FR) 224 so that the subwoofer 126 is used solely for producing low frequency components of all acoustic signals.

Figure 6:
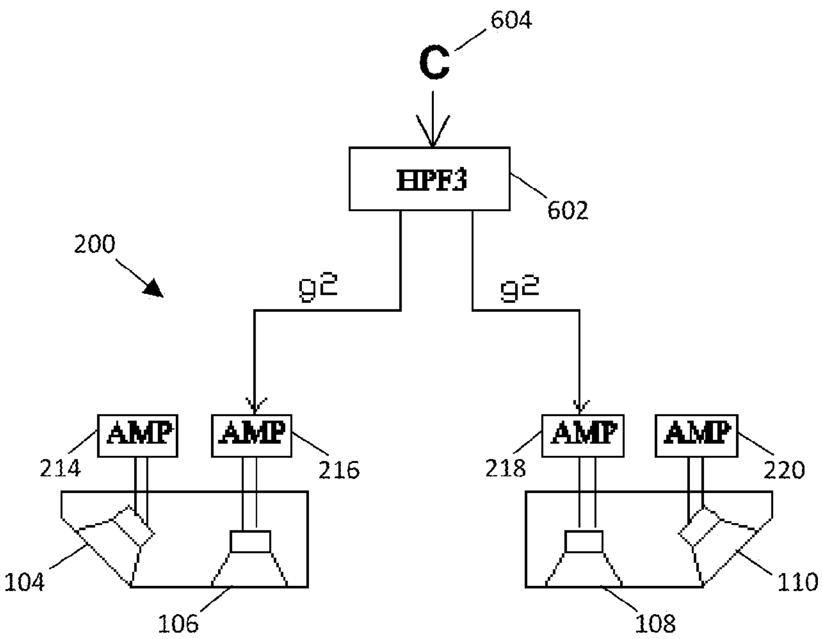
FIG. 6 shows a block diagram of the components of an audio system of an example embodiment of the present invention.

FIG. 6 shows the essential electronic components of the audio system 100 for processing the discrete centre audio signal (C) 604 of the 5.1 channel audio signals. The arrows in FIG. 6 indicate the direction of signal flow.

In FIG. 6, the discrete centre audio signal (C) 604 is sent to a third High Pass Filter 602, which filters out the low frequency components of the discrete centre audio signal (C) 604 and scale it by a scaling factor, g2, before passing the filtered and scaled signal to the third and sixth amplifiers 216 and 218 respectively for signal amplification and transmission to the inner left loudspeaker 106 and the inner right loudspeaker 110 respectively. As the discrete centre audio signal (C) 604 is reproduced at the two loudspeakers 106 and 108, its volume would appear to be louder compared to the volume of the left and right inclined signals produced by the outer left loudspeaker 104 and the outer right loudspeaker 110. The value of g2 is set as negative 3 decibels to deliberately lower the acoustic signal strength of the centre based sound so that the volume of the centre based sound would be balanced with the volume of the left and right inclined signals. In the example embodiment, the g2 value at this juncture is a gain factor contributed by a seventh amplifier (not shown in the figure) located downstream (i.e. after signal exits from the third High Pass Filter 602) of the third High Pass Filter 602. It is appreciated that in other example embodiments, the seventh amplifier may be incorporated in the circuitry of the third High Pass Filter 602. The seventh amplifier may also be in the form of an operational amplifier, in the form of a voltage divider, or the like.

The frequency response graph 702 of the third High Pass Filter 602 is shown in FIG. 7. High pass filtering is performed by the third High Pass Filter 602 to extract the high frequency components of the discrete centre audio signal (C) 604 so that the subwoofer 126 produces low frequency components of all acoustic signals and the four loudspeakers 104, 106, 108 and 110 produce high frequency components of all acoustic signals.

Figure 8:
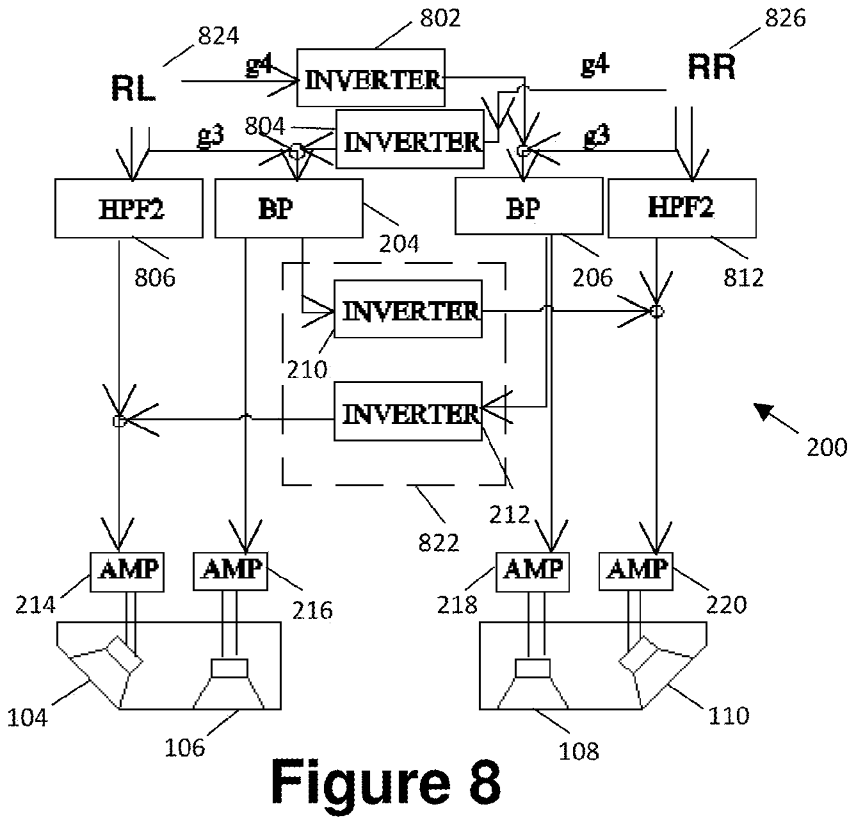
FIG. 8 shows a block diagram of the components of an audio system of an example embodiment of the present invention.

FIG. 8 shows the electronic components of the audio system 100 for processing the discrete rear left audio signal (RL) 824 and the discrete rear right audio signal (RR) 826 of the 5.1 channel audio signals. The arrows in FIG. 8 indicate the direction of signal flow.

In FIG. 8, the discrete rear left audio signal (RL) 824 is sent to a fourth High Pass Filter 806 to filter out the low frequency components of the discrete rear left audio signal (RL) 824. The fourth High Pass Filter 806 also dampens the discrete rear left audio signal (RL) 824 at around the frequency range of 5 KHz. It is appreciated that filtering the discrete rear left audio signal (RL) 824 using the fourth High Pass Filter 806 is not required in example embodiments without the subwoofer 126 because in the absence of the subwoofer 126, the outer left loudspeaker 104, inner left loudspeaker 106, inner right loudspeaker 108 and the outer right loudspeaker 110 will produce both high and low frequency components of all acoustic signals.

In a separate signal path, the discrete rear left audio signal (RL) 824 is scaled by a factor g4, which is in the range of 0.35 to 0.75, and passed through a third inverter 802. In the example embodiment, the g4 value at this juncture is a gain factor contributed by an eighth amplifier (not shown in the figure) located upstream (i.e. prior to signal entry into the third inverter 802) of the third inverter 802. It is appreciated that in other example embodiments, the eighth amplifier may be incorporated in the circuitry of the third inverter 802. The eighth amplifier may also be in the form of an operational amplifier, in the form of a voltage divider or the like. Subsequently, the signal from the third inverter 802 is sent to the second Band Pass Filter 206, followed by the second inverter 212.

The third inverter 802 introduces a time delay (i.e. phase shifting) to the discrete rear left audio signal (RL) 824, which has been scaled by the factor g4. In the example embodiment, the inverter 802 helps to cancel out interaural crosstalk to produce an out of phase sound effect, which is perceived by listeners as sound coming from all around the environment without any discernible direction.

The second Band Pass Filter 206 adjusts the discrete rear left audio signal (RL) 824 for the virtualization of the sound location of the outer left loudspeaker 104 and the inner left loudspeaker 106 to a location (906 in FIG. 9) located at the rear left location of the listener 118 by dampening high frequency components of the discrete rear left audio signal (RL) 824 in the range of approximately 1 KHz to 7 KHz. This dampening is illustrated in FIG. 10. In this manner, rear left surround sound effects are produced. The second Band Pass Filter 206 also filters out low frequency components of the discrete rear left audio signal (RL) 824 so that only the subwoofer 126 would be producing acoustic signals having low frequency components.

The second inverter 212 introduces a time delay (i.e. phase shifting) to the dampened discrete rear left audio signal (RL) 824 filtered by the Band Pass Filter 206. The reason for introducing this time delay would be discussed later with reference to FIG. 9.

The filtered output signal from the fourth High Pass Filter 806 and the band pass filtered, g4 scaled and phase shifted output signal from the second inverter 212 are subsequently sent to the second amplifier 214 for signal amplification before being transmitted to the outer left loudspeaker 104 for sound production.

There is present another signal path where the discrete rear left audio signal (RL) 824 is scaled by a factor g3, which is in the range of 0.7 to 1.5, and sent to the first Band Pass Filter 204. In the example embodiment, the g3 value at this juncture is a gain factor contributed by a ninth amplifier (not shown in the figure) located upstream (i.e. prior to signal entry into the first Band Pass Filter 204) of the first Band Pass Filter 204. It is appreciated that in other example embodiments, the ninth amplifier may be incorporated in the circuitry of first Band Pass Filter 204. The ninth amplifier may also be in the form of an operational amplifier, in the form of a voltage divider, or the like.

Subsequently, the output signal scaled by g3 from the first Band Pass Filter 204 is sent to the third amplifier 216 before being transmitted to the inner left loudspeaker 108 for sound production. The purpose for doing this is to widen the rear sound image perceived by listeners in the listening area 102.

Mirroring the processing of the discrete rear left audio signal (RL) 824, the discrete rear right audio signal (RR) 826 is sent to a fifth High Pass Filter 812, which is the same in design as the fourth High Pass Filter 806, to filter out the low frequency components of the discrete rear right audio signal (RR) 826. The fifth High Pass Filter 812 dampens the discrete rear right audio signal (RR) 826 at around the frequency range of 5 KHz. It is appreciated that filtering the discrete rear right audio signal (RR) 826 using the fifth High Pass Filter 812 is not required in example embodiments without the subwoofer 126 because in the absence of the subwoofer 126, the outer left loudspeaker 104, inner left loudspeaker 106, inner right loudspeaker 108 and the outer right loudspeaker 110 will produce both high and low frequency components of all acoustic signals.

In a separate signal path, the discrete rear right audio signal (RR) 826 is scaled by the factor g4 and passed through a fourth inverter 804. In the example embodiment, the g4 value at this juncture is a gain factor contributed by a tenth amplifier (not shown in the figure) located upstream (i.e. prior to signal entry into the fourth inverter 804) of the fourth inverter 804. It is appreciated that in other example embodiments, the tenth amplifier may be incorporated in the circuitry of the fourth inverter 804. The tenth amplifier may also be in the form of an operational amplifier, in the form of a voltage divider, or the like. Subsequently, the output signal from the fourth inverter 804 is sent to the first Band Pass Filter 204, followed by the first inverter 210.

The fourth inverter 804 introduces a time delay to the discrete rear right audio signal (RR) 826, which has been scaled by the factor g4. In the example embodiment, the fourth inverter 804 helps to cancel out interaural crosstalk to produce an out of phase sound effect, which can be perceived by listeners in the listening area (102 in FIG. 1) as sound coming from all around the environment without any discernible direction.

The first Band Pass Filter 204 adjusts the discrete rear right audio signal (RR) 826 for the virtualization of the sound location of the outer right loudspeaker 110 and the inner right loud speaker 108 to a location (908 in FIG. 9) located at the rear right of a listener (118 in FIG. 11) by dampening high frequency components of the discrete rear right audio signal (RR) 826 in the range of approximately 1 KHz to 7 KHz. This dampening is illustrated in FIG. 10. In this manner, rear right surround sound effects are produced. The first Band Pass Filter 204 also filters out low frequency components of the discrete rear right audio signal (RR) so that only the subwoofer 126 would be producing acoustic signals having low frequency components.

The first inverter 210 introduces a time delay to the dampened discrete rear left audio signal (RR) 826. The reason for introducing this time delay would be discussed later with reference to FIG. 9.

The filtered output signal from the fifth High Pass Filter 812 and the band pass filtered, g4 scaled and phase shifted output signal from the fourth inverter 804 are subsequently sent to the fifth amplifier 220 for signal amplification before being transmitted to the outer right loudspeaker 104 for sound production.

There is present another signal path where the discrete rear right audio signal (RR) 826 is scaled by the factor g3 and sent to the second Band Pass Filter 206. In the example embodiment, the g3 value at this juncture is a gain factor contributed by an eleventh amplifier (not shown in the figure) located upstream (i.e. prior to signal entry into the second Band Pass Filter 206) of the second Band Pass Filter 206. It is appreciated that in other example embodiments, the eleventh amplifier may be incorporated in the circuitry of second Band Pass Filter 206. The eleventh amplifier may also be in the form of an operational amplifier, in the form of a voltage divider, or the like.

Subsequently, the output signal scaled by g3 from the second Band Pass Filter 206 is sent to the sixth amplifier 218 before being transmitted to the inner left loudspeaker 106 for sound production. The purpose for doing this is to widen the rear sound image perceived by listeners in the listening area 102.

The value of g3 affects the weight of the rear surround sound effects produced by the plurality of loudspeakers 104, 106, 108 and 110. Lower g3 is linked to weaker rear surround sound effects and higher g3 is linked to stronger rear surround sound effects.

In the example embodiment, g3:g4 is maintained at the ratio 2:1. This ratio ensures that there is stronger perceived sound from the rear location closest to each respective left or right ear of the listener 118 in the listening area 102 compared to perceived sound from the rear location further away from each respective left or right ear of the listener 118. For instance, the left ear of the listener 118 would experience stronger virtualized sound from the rear left location (i.e. 906 in FIG. 9) of the listener 118 and the right ear of the listener 118 would experience stronger virtualized sound from the rear right location (i.e. 908 in FIG. 9) of the listener 118.

It is appreciated that the high passing components of the first and second Band Pass Filters 204 and 206 can be omitted in example embodiments without the subwoofer 126 because in the absence of the subwoofer 126, the outer left loudspeaker 104, inner left loudspeaker 106, inner right loudspeaker 108 and the outer right loudspeaker 110 will produce both high and low frequency components of all acoustic signals.

Figure 9:
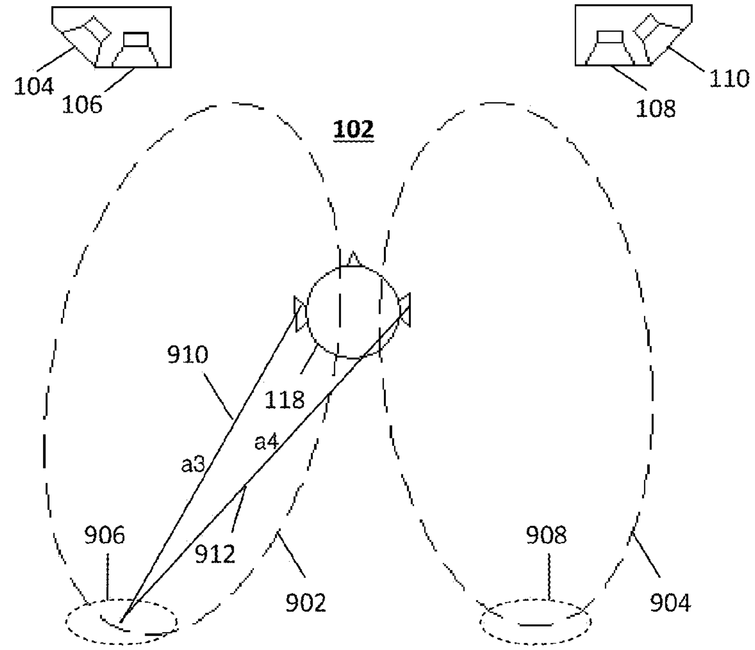
FIG. 9 illustrates virtualized sound production by an audio system of an example embodiment of the present invention.
Figure 10:
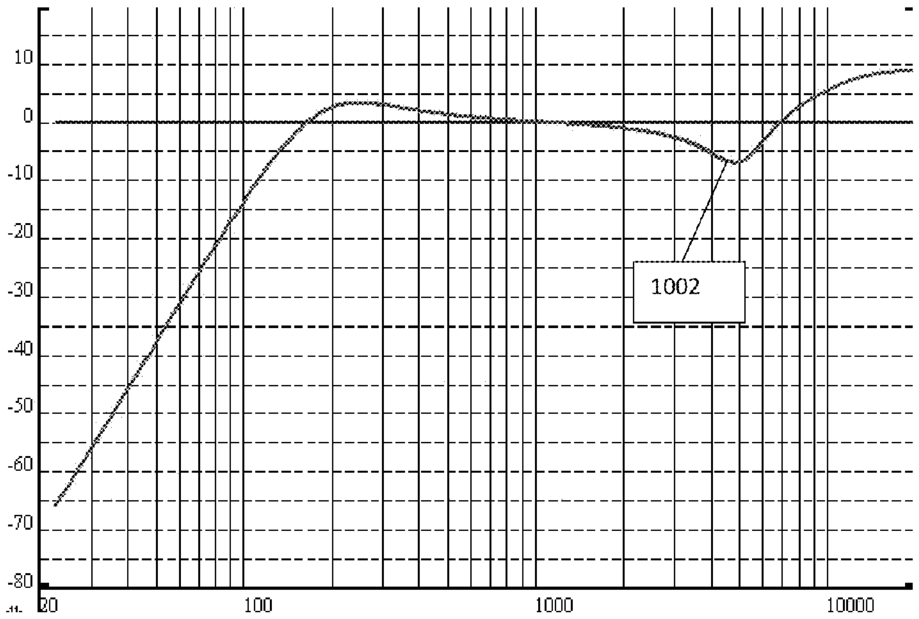
FIG. 10 shows a frequency response graph related to an audio system of an example embodiment of the present invention.

The virtualized rear sound output location 906 of the outer left loudspeaker 104 and the inner left loudspeaker 106 is illustrated in FIG. 9. With reference to FIG. 9, sound output a3 910 shows a trajectory of sound travelling to the left ear 304 of the listener 118 located at the centre of the listening area 102 in the case where the sound outputs from the outer left loudspeaker 104 and the inner left loudspeaker 106 are virtualized. Sound output a4 912 shows a trajectory of sound travelling to the right ear 306 of the listener 118 in the case where the sound outputs from the outer left loudspeaker 104 and the inner left loudspeaker 106 are virtualized to the virtualized sound output location 906. The trajectory of the virtualized sound output a4 912 is blocked by the listener's head, thus there is time delay for the sound to reach the listener's right ear 306 and lesser acoustic signal picked up by the listener's right ear 306. In order to produce virtualized sound output a4 912, the second Band Pass Filter 206 in FIG. 8 is used to dampen high frequency components of the processed discrete rear left audio signal (RL) 824 in the range of approximately 1 KHz to 7 KHz and the second inverter 412 in FIG. 8 is used to introduce time delay to the dampened high frequency components of the processed discrete rear left audio signal (RL) 824.

It is appreciated that the first inverter 410 and the first Band Pass Filter 204 are used in the same way as the second inverter 412 and the second Band Pass Filter 206 respectively. Hence, the aforementioned description written with reference to FIG. 9 could be similarly applied to explain the use of the first inverter 410 and the first Band Pass Filter 204 to create the perceived acoustic signals for the virtualized sound location 908.

In addition, FIG. 9 illustrates the ambience sound effects of the created virtual rear left and virtual rear right surround effects. To the listener 118, the virtual rear left surround effect appears to be surrounding an area indicated by broken line circle 902 and the virtual rear right surround effect appears to be surrounding an area indicated by broken line circle 904.

The common frequency response graph of the fourth and fifth High Pass Filter 806 and 812 is shown in FIG. 10. The signal drop portion 1002 at around 5 KHz is to create the drop in acoustic signal as heard by the listener 118 due to the rear sound blocking effect of the pinna of the ears of the listener 118.

Figure 11:
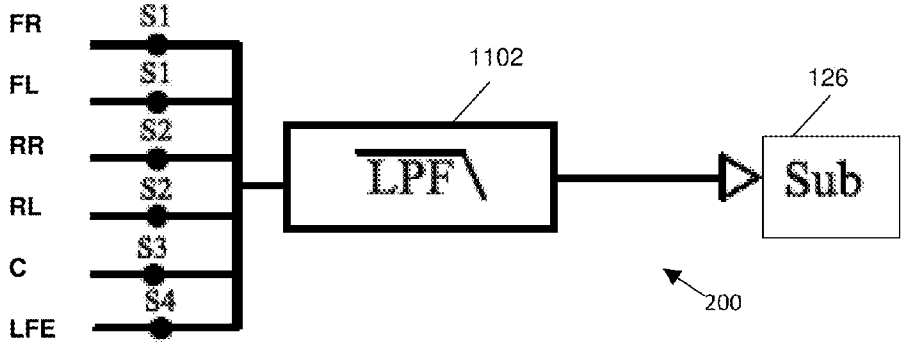
FIG. 11 shows a block diagram of the components of an audio system of an example embodiment of the present invention.

FIG. 11 shows the essential electronic components of the audio system 100 for low pass filtering all the 5.1 channel audio signals, namely the discrete front left audio signal (FL), the discrete front right audio signal (FR), the discrete rear left audio signal (RL), the discrete rear right audio signal (RR), the discrete centre audio signal (C) and the low frequency effects audio signal (LFE). All the 5.1 channel audio signals are scaled by respective scaling factors s1, s1, s2, s2, s3 and s4 and filtered by a low pass filter 1102 before being transmitted to the subwoofer 126. In the example embodiment, the values of these scaling factors s1, s2, s3 and s4 are equal to 1. The arrow in FIG. 11 indicates the direction of signal flow.

The mathematical equations representative of the audio system 100 are as follows:

$$OL=FL_H+RL_H-\text{Mix2}_B$$

$$IL=g2.C_H+\text{Mix1}_B$$

$$IR=g2.C_H+\text{Mix2}_B$$

$$OR=FR_H+RR_H-\text{Mix1}_B$$

$$S'=s1.FL_L+s1.FR_L+s2.RL_L+s2.RR_L+s3.C_L+s4.S_L$$

$$\text{Mix1}=g1.FL+g3.RL-g4.RR$$

$$\text{Mix2}=g1.FR+g3.RR-g4.RL$$

$$0.5\leq g1\leq 1 \text{ (}g1\text{ is in the range of 0.5 to 1)}$$

$$g2\approx 0.707 \text{ (i.e. negative 3 dB)}$$

$$0.7\leq g3\leq 1.5$$

$$g4/g3\approx 0.5 \text{ (Ratio of }g3:g4\text{ is 2:1)}$$

$$0.35\leq g4\leq 0.75$$

$$s1\approx s2\approx s3\approx s4\approx 1$$

where

OL is the transfer function of the combined audio signal sent to the outer left loudspeaker 104;

IL is the transfer function of the combined audio signal sent to the outer left loudspeaker 106;

IR is the transfer function of the combined audio signal sent to the outer left loudspeaker 108;

OR is the transfer function of the combined audio signal sent to the outer left loudspeaker 110;

FL is the transfer function of the discrete (5.1 channel based) front left audio signal (i.e. 222 in FIG. 2) inputted to the audio system 100;

$FL_L$ is the transfer function of FL after it has been low passed by the low pass filter 1102 in FIG. 11;

$FL_H$ is the transfer function of FL after it has been high passed by the first High Pass Filter 202 in FIG. 2;

FR is the transfer function of the discrete (5.1 channel based) front right audio signal (i.e. 224 in FIG. 2) inputted to the audio system 100;

$FR_L$ is the transfer function of FR after it has been low passed by the low pass filter 1102 in FIG. 11;

$FR_H$ is the transfer function of FR after it has been high passed by the second High Pass Filter 208 in FIG. 2;

RL is the transfer function of the discrete (5.1 channel based) rear left based input signal (i.e. 824 in FIG. 8) inputted to the audio system 100;

$RL_L$ is the transfer function of RL after it has been low passed by the low pass filter 1102 in FIG. 11;

$RL_H$ is the transfer function of RL after it has been high passed by the fourth High Pass Filter 806 in FIG. 8;

RR is the transfer function of the discrete (5.1 channel based) rear right audio signal (i.e. 826 in FIG. 8) inputted to the audio system 100; and $RR_L$ is the transfer function of RR after it has been low passed by the low pass filter 1102 in FIG. 11;

$RR_H$ is the transfer function of RR after it has been high passed by the fifth High Pass Filter 812 in FIG. 8;

C is the transfer function of the discrete (5.1 channel based) centre audio signal (i.e. 604 in FIG. 6) inputted to the audio system 100;

$C_L$ is the transfer function of C after it has been low passed by the low pass filter 1102 in FIG. 11;

$C_H$ is the transfer function of C after it has been high passed by the third High Pass Filter 602 in FIG. 6;

S is the transfer function of the subwoofer audio signal [i.e. the low frequency effects audio signal (LFE)] inputted to the audio system 100;

$S_L$ is the transfer function of Sub after it has been low passed by the low pass filter 1102 in FIG. 11;

S' is the transfer function of the audio signal sent to the subwoofer 126.

$Mix1_B$ is the transfer function of Mix1 after it has been bandpassed by the first band pass filter 204 in FIG. 2;

$Mix2_B$ is the transfer function of Mix2 after it has been bandpassed by, for instance, the second band pass filter 206 in FIG. 2; and transfer functions with '–' sign before them in the mathematical equations mean that they have been phase shifted or time delayed, more specifically, an 'out of phase' phase adjustment, which is carried out by the first and second inverters 210 and 212 respectively in FIG. 2, and the third and fourth inverters 802 and 804 respectively in FIG. 8.

Figure 12:
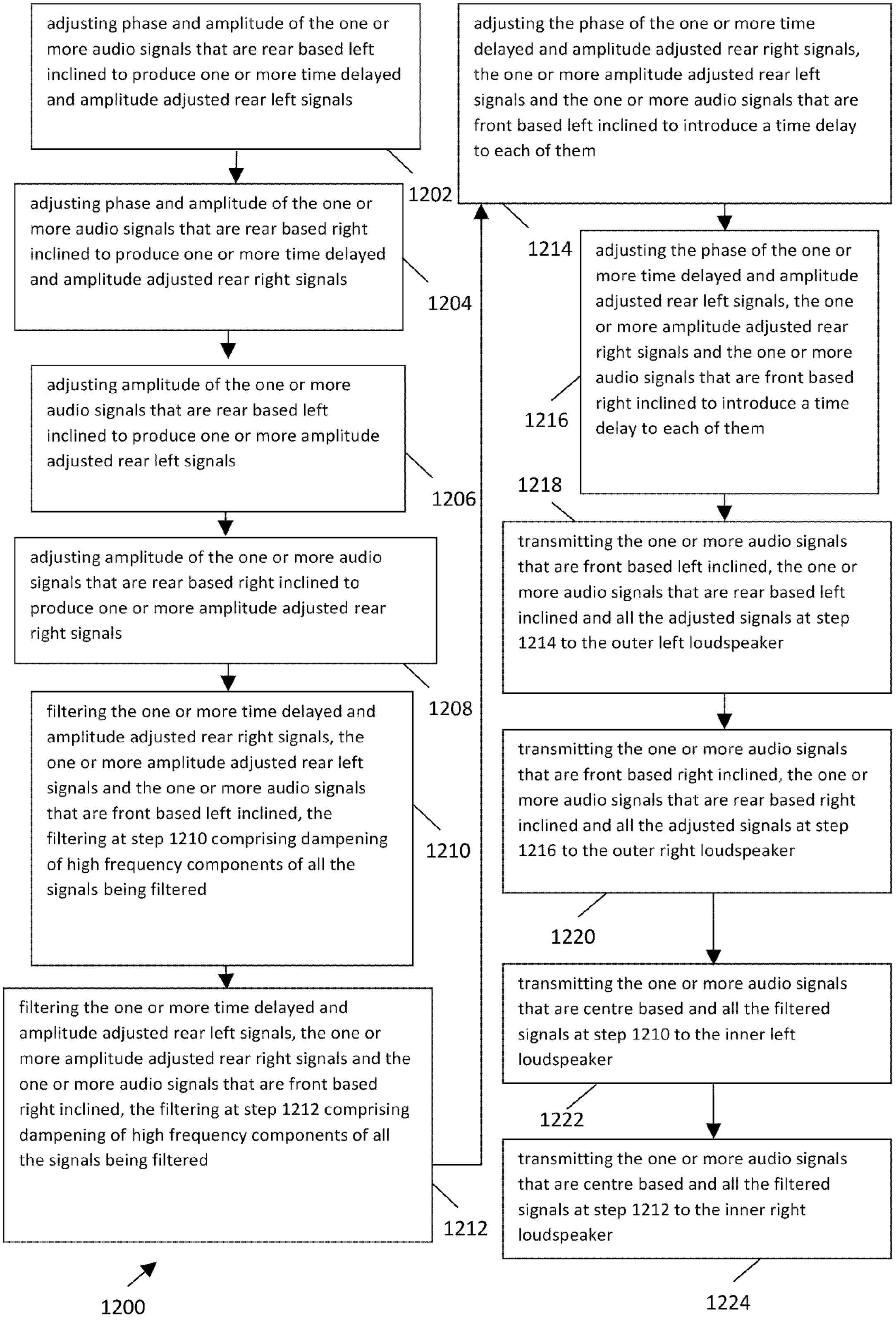
FIG. 12 shows a flowchart of a method carried out by an audio system of an example embodiment of the present invention.

Generally, the method carried out by the audio system of example embodiments of the present invention for processing one or more audio signals that are front based left inclined, front based right inclined, rear based left inclined, rear based right inclined and centre based to produce surround sound effects having wide and diffused sound images is illustrated by a flowchart 1200 shown in FIG. 12. This method may be carried out by a Digital Signal Processor or a system similar to the aforementioned audio system 100.

At step 1202, adjusting phase and amplitude of the one or more audio signals that are rear based left inclined [e.g. the discrete rear left audio signal 824 (RL)] to produce one or more time delayed and amplitude adjusted rear left signals. With reference to the previously discussed audio system 100 and its mathematical equations, step 1202 is responsible for "–g4.RL" in the equation of Mix2.

At step 1204, adjusting phase and amplitude of the one or more audio signals that are rear based right inclined [e.g. the discrete rear right audio signal 826 (RR)] to produce one or more time delayed and amplitude adjusted rear right signals. With reference to the previously discussed audio system 100 and its mathematical equations, step 1204 is responsible for "–g4.RR" in the equation of Mix1.

At step 1206, adjusting amplitude of the one or more audio signals that are rear based left inclined (e.g. RL) to produce one or more amplitude adjusted rear left signals. With reference to the previously discussed audio system 100 and its mathematical equations, step 1206 is responsible for "g3.RL" in the equation of Mix1.

At step 1208, adjusting amplitude of the one or more audio signals that are rear based right inclined (e.g. RR) to produce one or more amplitude adjusted rear right signals. With reference to the previously discussed audio system 100 and its mathematical equations, step 1208 is responsible for "g3.RR" in the equation of Mix2.

At step 1210, filtering the one or more time delayed and amplitude adjusted rear right signals (e.g. –g4.RR), the one or more amplitude adjusted rear left signals (e.g. g3.RL) and the one or more audio signals that are front based left inclined (e.g. g1.FL). The filtering at step 1210 includes dampening of high frequency components of all the signals being filtered. With reference to the previously discussed audio system 100 and its mathematical equations, step 1210 is responsible for the filtering of Mix1 to get "$Mix1_B$".

At step 1212, filtering the one or more time delayed and amplitude adjusted rear left signals (e.g. –g4.RL), the one or more amplitude adjusted rear right signals (e.g. g3.RR) and the one or more audio signals that are front based right inclined (e.g. g1.FR). The filtering at step 1212 includes dampening of high frequency components of all the signals being filtered. With reference to the previously discussed audio system 100 and its mathematical equations, step 1212 is responsible for the filtering of Mix2 to get "$Mix2_B$".

At step 1214, adjusting the phase of the one or more time delayed and amplitude adjusted rear right signals (e.g. –g4.RR), the one or more amplitude adjusted rear left signals (e.g. g3.RL) and the one or more audio signals that are front based left inclined (e.g. g1.FL) to introduce a time delay in each of them. With reference to the previously discussed audio system 100 and its mathematical equations, step 1214 is responsible for introducing a time delay to $Mix1_B$ to arrive at "$-Mix1_B$" in the equations of IL and OR.

At step 1216, adjusting the phase of the one or more time delayed and amplitude adjusted rear left signals (e.g. –g4.RL), the one or more amplitude adjusted rear right signals (e.g. g3.RR) and the one or more audio signals that are front based right inclined (e.g. g1.FR) to introduce a time delay in each of them. With reference to the previously discussed audio system 100 and its mathematical equations, step 1216 is responsible for introducing a time delay to $Mix2_B$ to arrive at "$-Mix2_B$" in the equations of OL and IR.

At step 1218, transmitting one or more audio signals that are front based left inclined (e.g. FL), one or more signals that are rear based left inclined (e.g. RL) and all the adjusted signals at step 1214 (e.g. $-Mix2_B$) to the outer left loudspeaker 104. With reference to the previously discussed audio system 100 and its mathematical equations, step 1218 is responsible for transmitting signals, represented by the equation, $OL=FL+RL-Mix2_B$, to the outer left loudspeaker 104 for surround sound production.

At step 1220, transmitting one or more audio signals that are front based right inclined (e.g. FR), one or more signals that are rear based right inclined (e.g. RR) and all the adjusted signals at step 1216 (e.g. $-Mix1_B$) to the outer right loudspeaker 110. With reference to the previously discussed audio system 100 and its mathematical equations, step 1220 is responsible for transmitting signals, represented by the equation, $OR=FR+RR-Mix1_B$, to the outer right loudspeaker 104 for surround sound production.

At step 1222, transmitting one or more audio signals that are centre based [i.e. the discrete centre audio signal (C)] and all the filtered signals at step 1210 (e.g. $Mix1_B$) to the inner left loudspeaker 106. With reference to the previously discussed audio system 100 and its mathematical equations, step 1222 is responsible for transmitting signals, represented by the equation, $IL=g2.C+Mix1_B$, to the inner left loudspeaker 106 for surround sound production.

At step 1224, transmitting one or more audio signals that are centre based [i.e. the discrete centre audio signal (C)] and all the filtered signals at step 1212 (e.g. $Mix2_B$) to the inner right loudspeaker 108. With reference to the previously discussed audio system 100 and its mathematical equations, step 1224 is responsible for transmitting signals, represented by the equation, IR=g2.C+Mix$2_B$, to the inner right loudspeaker 108 for surround sound production.

For example embodiments with subwoofer (e.g. 126 in FIGS. 1 and 11), the method described with reference to FIG. 12 may be adjusted to further include the step of transmitting the one or more low frequency effects audio signals to one or more subwoofers for audio bass production. The method may also include the steps of low pass filtering each of the multi-channel audio signals (e.g. the use of low pass filter 1102 in FIG. 11), followed by high pass filtering each of the multi-channel audio signals (e.g. generating $FL_H$, $RL_H$, $FR_H$, $RR_H$ and $C_H$) except the one or more low frequency effects audio signals [e.g. the subwoofer audio signal] before commencement of steps 1218, 1220, 1222 and 1224, and finally transmitting each of the low pass filtered multi-channel audio signals (e.g. S'=s1.$FL_L$+s1.$FR_L$+s2.$RL_L$+s2.$RR_L$+s3.$C_L$+s4.$S_L$) to a subwoofer for audio bass production. Also, for example embodiments with subwoofer (e.g. 126 in FIGS. 1 and 11), the method may be such that the filtering of steps 1210 and 1212 includes high pass filtering the signals being filtered at steps 1210 and 1212 so as to isolate the high frequency signals for further processing and all low frequency signals are channeled to the subwoofer.

At steps 1202 and 1204, the amplitude of all the signals adjusted may be adjusted by a first scaling factor (e.g. g4 in FIG. 8), which may be in the range of 0.35 to 0.75.

At steps 1206 and 1208, the amplitude of all the signals adjusted may be adjusted by a second scaling factor (e.g. g3 in FIG. 8), which may be in the range of 0.7 to 1.5.

The amplitude of the one or more audio signals that are front based left inclined and front based right inclined may be adjusted by a third scaling factor (e.g. g1 in FIG. 2), which may be in the range of 0.5 to 1.

At steps 1222 and 1224, the one or more audio signals that are centre based [e.g. the discrete centre based audio signal (C)] may be scaled by negative 3 decibels (g2≈0.707).

It is appreciated that example embodiments of the present invention can also provide surround sound production for two audio channel inputs and not just for the 5.1 audio channel inputs.

For instance, the audio system of example embodiments of the present invention can be used to convert stereo (i.e. 2) channel audio signals, consisting of a left channel audio input and a right channel audio input, into audio input signals for surround sound production on the four loudspeakers (e.g. the outer left loudspeaker 104, the inner left loudspeaker 106, the inner right loudspeaker 108 and the outer right loudspeaker 110 in FIG. 1). This can be achieve by providing the left channel audio signal of the stereo channel audio signals as a front based left inclined audio signal of the multi-channel audio signals, providing the right channel audio signal of the stereo channel audio signals as a front based right inclined audio signal of the multi-channel audio signals and providing zero signal as each of the one or more audio signals categorized as low frequency effects audio signals and the one or more audio signals that is centre based, rear based left inclined, and rear based right inclined.

In other words, with reference to the audio system 100 in FIG. 1,

- the discrete front left audio signal 222 (FL) is replaced with the left channel audio signal of the stereo channel audio signals;
- the discrete front right audio signal 224 (FR) is replaced with the right channel audio signal of the stereo channel audio signals; and
- the discrete centre audio signal 604 (C), the discrete rear left audio signal 824 (RL) and the discrete rear right audio signal 826 (RR) are set to zero or disregarded for signal processing.

After setting the appropriate signals to zero and replacing said signals with the left and right channel audio signals as audio inputs, the mixing and processing for the stereo channel audio signals can be carried out in the same manner as described in the case for the audio system 100, which has 5.1 audio channel signals as inputs. The result is the production of surround sound effects by the audio system 100 with the stereo channel audio signals as inputs.

For example embodiments having more than 5.1 audio channel inputs, there would be discrete audio signals that can provide sound in directions beyond that covered by just audio signals that are front based left inclined, front based right inclined, rear based left inclined, rear based right inclined and centre based. For instance, 7.1 audio channel inputs has a discrete front left audio signal, a discrete front right audio signal, a discrete centre audio signal, a discrete left surround audio signal, a discrete right surround audio signal, a discrete rear left audio signal, a discrete rear right audio signal and a low-frequency effects audio signal. The two additional sound directions covered are the left surround region and the right surround region.

To convert 7.1 audio channel inputs for surround sound production using the audio system of example embodiments of the present invention, firstly, a down mixing preamplifier or circuitry is required to down mix the 7.1 inputs into 5.1 inputs before signal processing is commenced by the audio system of the example embodiments of the present invention. Similarly, suitable down mixing amplifiers or circuitries are necessary for converting other multi-channel audio inputs, such as 6.1, 8.1, 10.2, 22.2 and the like into 5.1 inputs first before signal processing is commenced by the audio system of the example embodiments of the present invention. With regard to 4.1 inputs, suitable up mixing amplifiers are necessary to convert it into 5.1 inputs prior to signal processing by the audio system of the example embodiments.

Generally, example embodiments of the present invention relates to an audio system (e.g. 100 in FIG. 1) for processing multi-channel audio signals for surround sound production on a plurality of loudspeakers to a listening area (e.g. 102 in FIG. 1). The plurality of loudspeakers is generally front located with respect to the listening area (e.g. 102 in FIG. 1). The plurality of loudspeaker includes an outer left loudspeaker (e.g. 104 in FIG. 1), an inner left loudspeaker (e.g. 106 in FIG. 1), an inner right loudspeaker (e.g. 108 in FIG. 1) and an outer right loudspeaker (e.g. 110 in FIG. 1). The multi-channel audio signals include one or more low frequency effects audio signals and one or more audio signals that are front based left inclined, front based right inclined, rear based left inclined, rear based right inclined, and centre based (e.g. 5.1 channel audio signals).

The audio system includes first adjusting means (e.g. 802, 206 and 212 in FIG. 8) for adjusting phase and amplitude of the one or more audio signals that are rear based left inclined to produce one or more time delayed and amplitude adjusted rear left signals (i.e. corresponding with step 1202 in FIG. 12).

The audio system includes second adjusting means (e.g. 804, 204 and 210 in FIG. 8) for adjusting phase and amplitude of the one or more audio signals that are rear based right inclined to produce one or more time delayed and amplitude adjusted rear right signals (i.e. corresponding with step 1204 in FIG. 12).

The audio system includes first scaling means (e.g. the ninth and eleventh amplifiers for g3 scaling) for adjusting amplitude of the one or more audio signals that are rear based left inclined to produce one or more amplitude adjusted rear left signals (i.e. corresponding with step 1206 in FIG. 12).

The audio system includes second scaling means (e.g. the tenth and eleventh amplifiers for g3 scaling) for adjusting amplitude of the one or more audio signals that are rear based right inclined to produce one or more amplitude adjusted rear right signals (i.e. corresponding with step 1208 in FIG. 12).

The audio system includes first filtering means (e.g. 204 in FIGS. 2 and 8) for filtering the one or more time delayed and amplitude adjusted rear right signal, the one or more amplitude adjusted rear left signal and the one or more audio signals that are front based left inclined (i.e. corresponding with step 1210 in FIG. 12). The high frequency components of the signals that are filtered by the first filtering means are dampened (e.g. the 1 KHz to 7 KHz dampening in FIG. 10 and the 0.5 KHz to 20 KHz dampening in FIG. 5).

The audio system includes second filtering means (e.g. 206 in FIGS. 2 and 8) for filtering the one or more time delayed and amplitude adjusted rear left signal, the one or more amplitude adjusted rear right signal and the one or more audio signals that are front based right inclined (i.e. corresponding with step 1212 in FIG. 12). The high frequency components of the signals that are filtered by the second filtering means are dampened (e.g. the 1 KHz to 7 KHz dampening shown in FIG. 10 and the 0.5 KHz to 20 KHz dampening shown in FIG. 5).

The audio system includes first phase adjusting means (e.g. 210 in FIGS. 2 and 8) for adjusting the phase of the one or more time delayed and amplitude adjusted rear right signal, the one or more amplitude adjusted rear left signal and the one or more audio signals that are front based left inclined to introduce a time delay in each of them (i.e. corresponding with step 1214 in FIG. 12).

The audio system includes second phase adjusting means (e.g. 212 in FIGS. 2 and 8) for adjusting the phase of the one or more time delayed and amplitude adjusted rear left signal, the one or more amplitude adjusted rear right signal and the one or more audio signals that are front based right inclined to introduce a time delay in each of them (i.e. step 1216 in FIG. 12).

After the aforementioned signal processing, the outer left loudspeaker of the audio system receives the one or more audio signals that are front based left inclined, the one or more signals that are rear based left inclined and all the signals adjusted by the first phase adjusting means (i.e. corresponding with step 1218 in FIG. 12). The outer right loudspeaker of the audio system receives the one or more audio signals that are front based right inclined, the one or more signals that are rear based right inclined and all the signals adjusted by the second phase adjusting means (i.e. corresponding with step 1224 in FIG. 12). The inner left loudspeaker of the audio system receives the one or more audio signals that are centre based and all the signals adjusted by the first filtering means (i.e. corresponding with step 1220 in FIG. 12). The inner right loudspeaker of the audio system receives the one or more audio signals that are centre based and all the signals adjusted by the second filtering means (i.e. corresponding with step 1222 in FIG. 12).

For example embodiments of an audio system with subwoofer (e.g. 126 in FIGS. 1 and 11), the audio system may further include low pass filtering means (e.g. the use of low pass filter 1102 in FIG. 11) for filtering each of the multi-channel audio signals. It may also include high pass filtering means (e.g. the use of high pass filters 202, 208, 602, 806 and 812 and the high passing portion of the band pass filters 204 and 206) for filtering each of the multi-channel audio signals except the one or more low frequency effects audio signals before the outer left loudspeaker, the outer right loudspeaker, the inner left loudspeaker and the inner right loudspeaker receive any audio signals. The subwoofer (e.g. 126 in FIGS. 1 and 11) may receive each of the low pass filtered multi-channel audio signals for audio bass production. Furthermore, the first filtering means (e.g. 204 in FIGS. 2 and 8) and the second filtering means (e.g. 206 in FIGS. 2 and 8) may include high pass filtering the signals filtered by the first filtering means (e.g. 206 in FIGS. 2 and 8) and the second filtering means (e.g. 206 in FIGS. 2 and 8).

Figure 13:
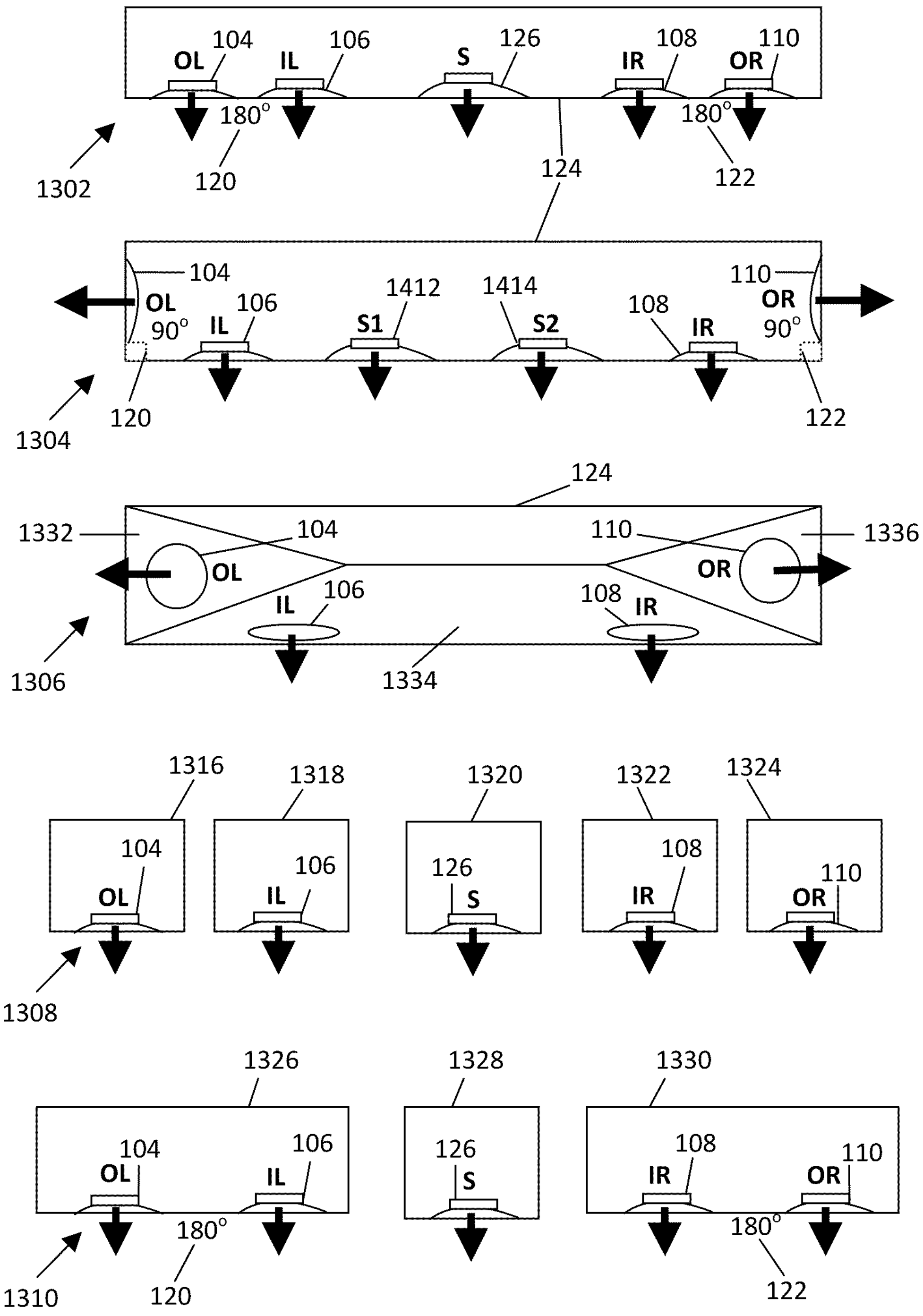
FIG. 13 shows the top views of audio systems of various example embodiments of the present invention.

FIG. 13 shows the top views of various examples of the exterior design of the audio system 100 described with reference to FIG. 1. Some reference numerals are reused in the examples to illustrate similarity in the components. It is appreciated that the examples shown in FIG. 13 are non-exhaustive. All the loudspeakers in FIG. 13 except for a third example 1306 are made visible in the top view for illustration purposes. The loudspeakers would not be visible in the top view of actual implementations, as they would be covered by the chassis of the loudspeakers.

A first example 1302 shown in FIG. 13 is similar to the audio system 100 in FIG. 1 in that there are also four loudspeakers residing on an elongated rectangular body 124. However, in this case, the plane on which the outer left loudspeaker 104 is mounted on the elongated rectangular body 124 is at an angle 120 of 180 degrees relative to the plane on which the inner left loudspeaker 106 is mounted on the elongated rectangular body 124. Similarly, the plane on which the outer right loudspeaker 110 is mounted on the elongated rectangular body 124 is at an angle 122 of about 180 degrees relative to the plane on which the inner right loudspeaker 108 is mounted on the elongated rectangular body 124. Basically, this means that all the four loudspeakers are lying in the same plane, which is facing the listening area 102. It is noted that the first example 1302 does not have a subwoofer 126. For embodiments of the present invention without a subwoofer, all the low frequency audio range production (i.e. bass) would be handled by the four loudspeakers.

A second example 1304 in FIG. 13 is different from the first example 1302 in that the plane on which the outer left loudspeaker 104 is mounted on the elongated rectangular body 124 is at an angle 120 of about 90 degrees relative to the plane on which the inner left loudspeaker 106 is mounted on the elongated rectangular body 124. Also, the plane on which the outer right loudspeaker 110 is mounted on the elongated rectangular body 124 is at an angle 122 of about 90 degrees relative to the plane on which the inner right loudspeaker 108 is mounted on the elongated rectangular body 124. Such about 90 degrees arrangement of the outer left loudspeaker 104 and outer right loudspeaker 110 is known as lateral or side firing. Furthermore, there are two subwoofers 1312 (S1) and 1314 (S2) located between the inner left loudspeaker 106 and the inner right loudspeaker 108 instead of one. Having more subwoofers can provide stronger bass production.

In a third example 1306 in FIG. 13, a first plane 1332 on which the outer left loudspeaker 104 is mounted on the elongated rectangular body 124 and a second plane 1336 on which the outer right loudspeaker 110 is mounted on the elongated rectangular body 124 are in triangular shapes. A third plane 1334 on which the inner left loudspeaker 106 and the inner right loudspeaker 108 are mounted on the elongated rectangular body 124 is shaped as a trapezium. The planes 1332, 1334 and 1336 on which the loudspeakers 104, 106, 108 and 110 are mounted in the third example 1306 are inclined or sloped unlike the planes on which the loudspeakers 104, 106, 108 and 110 are mounted in the first and the second examples 1302 and 1304, which are either facing forward (i.e. facing the listening area 102) or sideward (i.e. the side firing arrangement in the second example 1304) respectively. Due to the inclination and sloping, the angle between the first plane 1332 and the second plane 1334 and the angle between the third plane 1336 and the second plane 1334 varies according to the height of the elongated rectangular body 124 of the third example 1306. The third example 1306 illustrates that an embodiment of the present invention may have its loudspeakers located in such inclined or sloping positions. It is further appreciated that in other example embodiments, one or more subwoofer could be included in the third example 1306.

In a fourth example 1308 in FIG. 13, there are five separate units 1316, 1318, 1320, 1322 and 1324. Each of the outer left loudspeaker 104, inner left loudspeaker 106, inner right loudspeaker 108, the outer right loudspeaker 110 and the subwoofer 126 are mounted on separate units.

The fifth example 1310 in FIG. 13 is arranged such that there are three separate units 1326, 1328 and 1330. The outer left loudspeaker 104 and inner left loudspeaker 106 are mounted on the same forward facing plane in one separate unit 1326. The inner right loudspeaker 108 and the outer right loudspeaker 110 are mounted on the same forward facing plane in another separate unit 1330. The subwoofer 126 is mounted on yet another separate unit 1328.

The fourth and fifth examples 1308 and 1310 serve to illustrate that embodiments of the present invention could have one or more loudspeakers mounted on a separate unit or units split away from the rest of the loudspeakers.

Figure 14:
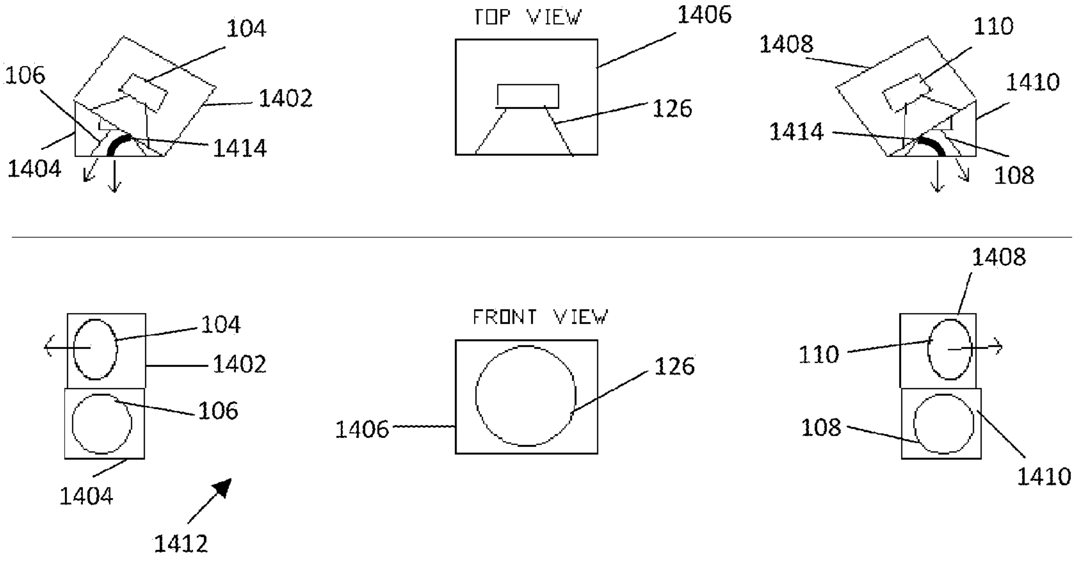
FIG. 14 shows top and front views of an audio system of an example embodiment of the present invention.

FIG. 14 shows the top and front views of a sixth example 1412 of the exterior design of the audio system 100 described with reference to FIG. 1. Previous reference numerals are reused to illustrate similarity in the components. In the sixth example 412, there are five separate units 1402, 1404, 1406, 1408 and 1410. Each of the outer left loudspeaker 104, inner left loudspeaker 106, inner right loudspeaker 108, the outer right loudspeaker 110 and the subwoofer 126 are mounted on separate units. The unit 1402 with the outer left loudspeaker 104 is stacked on top of the unit 1404 with the inner left loudspeaker 106 and the unit 1408 with the outer right loudspeaker 108 is stacked on top of the unit 1410 with the inner right loudspeaker 110. Furthermore, the inner left loudspeaker 106 and the inner right loudspeaker 110 are facing forward whereas the outer left loudspeaker 104 and the outer right loudspeaker 108 are facing away from each other at an angle 1414 relative to the forward facing planes of the inner left loudspeaker 106 and the inner right loudspeaker 110 respectively. This angle 1414 may be in the range of 0 to 90 degrees. It is appreciated that in other example embodiments of the present invention, the unit 1402 with the outer left loudspeaker 104 could also be stacked below the unit 1404 with the inner left loudspeaker 106 and the unit 1408 with the outer right loudspeaker 108 could also be stacked below the unit 1410 with the inner right loudspeaker 110. The word "stacked" used herein covers not just making contact, it also covers mounting permanently the unit 1402 to the unit 1404 and the unit 1408 to the unit 1410. An advantage of the sixth example 1412 is that it takes up lesser sitting space compared to the other examples in FIG. 13.

Many modifications and other embodiments can be made to the method and audio system for processing multi-channel audio signals for surround sound production on a plurality of loudspeakers to a listening area herein described by those skilled in the art having the understanding of the above described disclosure together with the drawings. Therefore, it is to be understood that the method and audio system for processing multi-channel audio signals for surround sound production on a plurality of loudspeakers to a listening area and their utility is not to be limited to the above description contained herein only, and that possible modifications are to be included in the claims of the disclosure.

The invention claimed is:

1. A method for processing multi-channel audio signals for surround sound production on a plurality of loudspeakers to a listening area, the plurality of loudspeakers being front located with respect to the listening area, the plurality of loudspeakers comprising an outer left loudspeaker, an inner left loudspeaker, an inner right loudspeaker and an outer right loudspeaker, the multi-channel audio signals comprising one or more low frequency effects audio signals and one or more audio signals that are front based left inclined, front based right inclined, rear based left inclined, rear based right inclined, and centre based, the method comprising:

(a) adjusting phase and amplitude of the one or more audio signals that are rear based left inclined to produce one or more time delayed and amplitude adjusted rear left signals;

(b) adjusting phase and amplitude of the one or more audio signals that are rear based right inclined to produce one or more time delayed and amplitude adjusted rear right signals;

(c) adjusting amplitude of the one or more audio signals that are rear based left inclined to produce one or more amplitude adjusted rear left signals;

(d) adjusting amplitude of the one or more audio signals that are rear based right inclined to produce one or more amplitude adjusted rear right signals;

(e) filtering the one or more time delayed and amplitude adjusted rear right signals, the one or more amplitude adjusted rear left signals and the one or more audio signals that are front based left inclined, the filtering of step (e) comprising dampening of high frequency components of the signals being filtered;

(f) filtering the one or more time delayed and amplitude adjusted rear left signals, the one or more amplitude adjusted rear right signals and the one or more audio signals that are front based right inclined, the filtering of step (f) comprising dampening of high frequency components of the signals being filtered;

(g) adjusting the phase of the one or more time delayed and amplitude adjusted rear right signals, the one or more amplitude adjusted rear left signals and the one or more audio signals that are front based left inclined to introduce a time delay to each of them;

(h) adjusting the phase of the one or more time delayed and amplitude adjusted rear left signals, the one or more amplitude adjusted rear right signals and the one or more audio signals that are front based right inclined to introduce a time delay to each of them;

(i) transmitting the one or more audio signals that are front based left inclined, the one or more audio signals that are rear based left inclined and all the adjusted signals at step (g) to the outer left loudspeaker;

(j) transmitting the one or more audio signals that are front based right inclined, the one or more audio signals that are rear based right inclined and all the adjusted signals at step (h) to the outer right loudspeaker;

(k) transmitting the one or more audio signals that are centre based and all the filtered signals at step (e) to the inner left loudspeaker; and (l) transmitting the one or more audio signals that are centre based and all the filtered signals at step (f) to the inner right loudspeaker.

2. The method as claimed in claim 1, the method further comprising:

transmitting the one or more low frequency effects audio signals to a subwoofer of the plurality of loudspeakers for audio bass production.

3. The method as claimed in claim 1, the method further comprising:

low pass filtering each of the multi-channel audio signals;

high pass filtering each of the multi-channel audio signals except the one or more low frequency effects audio signals before commencement of steps (i), (j), (k) and (l); and transmitting each of the low pass filtered multi-channel audio signals to a subwoofer of the plurality of loudspeakers for audio bass production, wherein the filtering of steps (e) and (f) comprising high pass filtering the signals being filtered at steps (e) and (f).

4. The method as claimed in claim 1, wherein adjusting amplitude at steps (a) and (b) adjusts said signals by a first scaling factor in the range of 0.35 to 0.75.

5. The method as claimed in claim 1, wherein adjusting amplitude at steps (c) and (d) adjusts said signals by a second scaling factor in the range of 0.7 to 1.5.

6. The method as claimed in claim 1, the method further comprising adjusting amplitude of the one or more audio signals that are front based left inclined and front based right inclined by a third scaling factor in the range of 0.5 to 1.

7. The method as claimed in claim 1, the method further comprising:

adjusting amplitude of the one or more audio signals that are centre based by negative 3 decibels.

8. The method as claimed in claim 1, the method further comprising steps for converting stereo channel audio signals into audio input signals for surround sound production on the plurality of loudspeakers, the steps comprising:

providing the left channel audio signal of the stereo channel audio signals as a front based left inclined audio signal of the multi-channel audio signals;

providing the right channel audio signal of the stereo channel audio signals as a front based right inclined audio signal of the multi-channel audio signals; and providing zero signal as each of the one or more low frequency effects audio signal and each of the one or more audio signals that are centre based, rear based left inclined, and rear based right inclined.

9. An audio system for processing multi-channel audio signals for surround sound production on a plurality of loudspeakers to a listening area, the plurality of loudspeakers being front located with respect to the listening area, the plurality of loudspeakers comprising an outer left loudspeaker, an inner left loudspeaker, an inner right loudspeaker and an outer right loudspeaker, the multi-channel audio signals comprising one or more low frequency effects audio signals and one or more audio signals that are front based left inclined, front based right inclined, rear based left inclined, rear based right inclined, and centre based, the audio system comprising:

first adjusting means for adjusting phase and amplitude of the one or more audio signals that are rear based left inclined to produce one or more time delayed and amplitude adjusted rear left signals;

second adjusting means for adjusting phase and amplitude of the one or more audio signals that are rear based right inclined to produce one or more time delayed and amplitude adjusted rear right signals;

first scaling means for adjusting amplitude of the one or more audio signals that are rear based left inclined to produce one or more amplitude adjusted rear left signals;

second scaling means for adjusting amplitude of the one or more audio signals that are rear based right inclined to produce one or more amplitude adjusted rear right signals;

first filtering means for filtering the one or more time delayed and amplitude adjusted rear right signal, the one or more amplitude adjusted rear left signal and the one or more audio signals that are front based left inclined, the high frequency components of the signals being dampened by the first filtering means;

second filtering means for filtering the one or more time delayed and amplitude adjusted rear left signal, the one or more amplitude adjusted rear right signal and the one or more audio signals that are front based right inclined, the high frequency components of the signals being dampened by the second filtering means;

first phase adjusting means for adjusting the phase of the one or more time delayed and amplitude adjusted rear right signal, the one or more amplitude adjusted rear left signal and the one or more audio signals that are front based left inclined to introduce a time delay in each of them; and second phase adjusting means for adjusting the phase of the one or more time delayed and amplitude adjusted rear left signal, the one or more amplitude adjusted rear right signal and the one or more audio signals that are front based right inclined to introduce a time delay in each of them, the outer left loudspeaker receiving the one or more audio signals that are front based left inclined, the one or more signals that are rear based left inclined and all the signals adjusted by the first phase adjusting means, the outer right loudspeaker receiving the one or more audio signals that are front based right inclined, the one or more signals that are rear based right inclined and all the signals adjusted by the second phase adjusting means, the inner left loudspeaker receiving the one or more audio signals that are centre based and all the signals adjusted by the first filtering means, and the inner right loudspeaker receiving the one or more audio signals that are centre based and all the signals adjusted by the second filtering means.

10. The audio system as claimed in claim 9, the audio system further comprising a subwoofer receiving the one or more low frequency effects audio signals for audio bass production.

11. The audio system as claimed in claim 9, the audio system further comprising:

low pass filtering means for filtering each of the multi-channel audio signals;

high pass filtering means for filtering each of the multi-channel audio signals except the one or more low frequency effects audio signals before the outer left loudspeaker, the outer right loudspeaker, the inner left loudspeaker and the inner right loudspeaker receive any audio signals; and a subwoofer receiving each of the low pass filtered multi-channel audio signals for audio bass production, wherein the filtering carried out by the first filtering means and the second filtering means being high pass filtering.

12. The audio system as claimed in claim 9, the first adjusting means and the second adjusting means adjusting the amplitude of the respective signals by a first scaling factor in the range of 0.35 to 0.75.

13. The audio system as claimed in claim 9, the first scaling means and the second scaling means adjusting the amplitude of the respective signals by a second scaling factor in the range of 0.7 to 1.5.

14. The audio system as claimed in claim 9, the audio system further comprising third scaling means for adjusting the amplitude of the one or more audio signals that are front based left inclined and front based right inclined by a third scaling factor in the range of 0.5 to 1.

15. The audio system as claimed in claim 9, wherein the amplitude of the one or more audio signals that are centre based being scaled by negative 3 decibels.

16. The audio system as claimed in claim 9, in the conversion of stereo channel audio signals into audio input signals for surround sound production on the plurality of loudspeakers, the left channel audio signal of the stereo channel audio signals being provided as a front based left inclined audio signal of the multi-channel audio signals, the right channel audio signal of the stereo channel audio signals being provided as a front based right inclined audio signal of the multi-channel audio signals, and zero signal being provided as each of the one or more low frequency effects audio signal and each of the one or more audio signals that are centre based, rear based left inclined, and rear based right inclined.

17. The audio system as claimed in claim 9, the outer left loudspeaker, the inner left loudspeaker, the outer right loudspeaker and the inner right loudspeaker facing the listening area and being spaced along a speaker axis defined as a line passing through the outer left, the inner left, the inner right and the outer right locations of said loudspeakers.

18. The audio system as claimed in claim 10, wherein the subwoofer is located between the inner left loudspeaker and the inner right loudspeaker.

19. The audio system as claimed in claim 11, wherein the subwoofer is located between the inner left loudspeaker and the inner right loudspeaker.

20. The audio system as claimed in claim 9, wherein a first plane on which the outer left loudspeaker is mounted on being arranged at a first angle relative to a second plane on which the inner left loudspeaker is mounted on; and a third plane on which the outer right loudspeaker is mounted on being arranged at a second angle relative to a fourth plane on which the inner right loudspeaker is mounted on.

21. The audio system as claimed in claim 20, wherein the outer left loudspeaker or the outer right loudspeaker is stacked on top or below the inner left loudspeaker or the inner right loudspeaker respectively.

22. The audio system as claimed in claim 20, wherein each of the first angle and the second angle being in the range of 90 to 180 degrees.

23. The audio system as claimed in claim 20, wherein value of each of the first angle or the second angle varies.

24. The audio system as claimed in claim 9, the plurality of loudspeakers being contained within a single enclosure.

* * * * *